US010840756B2

(12) United States Patent
Takizawa et al.

(10) Patent No.: US 10,840,756 B2
(45) Date of Patent: Nov. 17, 2020

(54) ROTOR AND MOTOR OF ROTATING ELECTRICAL DEVICE

(71) Applicant: Mitsubishi Electric Corporation, Tokyo (JP)

(72) Inventors: Yuji Takizawa, Tokyo (JP); Satoru Akutsu, Tokyo (JP); Shusuke Hori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 432 days.

(21) Appl. No.: 15/540,484

(22) PCT Filed: Mar. 2, 2015

(86) PCT No.: PCT/JP2015/056083
§ 371 (c)(1),
(2) Date: Jun. 28, 2017

(87) PCT Pub. No.: WO2016/139719
PCT Pub. Date: Sep. 9, 2016

(65) Prior Publication Data
US 2017/0373549 A1    Dec. 28, 2017

(51) Int. Cl.
*H02K 1/27*    (2006.01)
*H02K 5/04*    (2006.01)
*B62D 5/04*    (2006.01)

(52) U.S. Cl.
CPC .............. *H02K 1/278* (2013.01); *H02K 5/04* (2013.01); *B62D 5/0403* (2013.01)

(58) Field of Classification Search
CPC ......... H02K 1/278; H02K 5/04; B62D 5/0403
See application file for complete search history.

(56) References Cited

U.S. PATENT DOCUMENTS

| | | | |
|---|---|---|---|
| 5,760,520 A | 6/1998 | Hasebe et al. | |
| 7,687,957 B2* | 3/2010 | Ochiai | H02K 1/278 310/156.08 |

(Continued)

FOREIGN PATENT DOCUMENTS

| | | | | |
|---|---|---|---|---|
| EP | 2903139 A1 * | 8/2015 | ............. | H02K 1/278 |
| JP | 9-182387 A | 7/1997 | | |

(Continued)

OTHER PUBLICATIONS

Machine translation of Brose Fahrzeugteili Gmbh & Co Kg et al. [WO2011147498] (Year: 2011).*

(Continued)

*Primary Examiner* — Bernard Rojas
(74) *Attorney, Agent, or Firm* — Sughrue Mion, PLLC; Richard C. Turner

(57) ABSTRACT

A front iron core includes a first iron core main body and a plurality of first projecting sections which project to a radial outer side from the first iron core main body. A second iron core includes a second iron core main body which overlaps with the first iron core main body and a plurality of second projecting sections which project to a radial outer side from the second iron core main body. When a rotor iron core is viewed along the axis line, portions of the second projecting sections protrude as extension sections to outward in the circumferential direction, from the first projecting sections. Furthermore, when the rotor iron core is viewed along the axis line, radial-direction outer side end surfaces of the extension parts are smoothly continuous with radial-direction outer side end surfaces of the first projecting sections.

8 Claims, 14 Drawing Sheets

(56) References Cited

U.S. PATENT DOCUMENTS

| | | | |
|---|---|---|---|
| 9,143,014 B2* | 9/2015 | Taniguchi | ................ H02K 1/28 |
| 2010/0301695 A1 | 12/2010 | Yamada et al. | |
| 2014/0265706 A1* | 9/2014 | Yamada | ............... H02K 1/2746 |
| | | | 310/156.43 |

FOREIGN PATENT DOCUMENTS

| | | |
|---|---|---|
| JP | 2008-109726 A | 5/2008 |
| JP | 2010-246233 A | 10/2010 |
| JP | 2013-251968 A | 12/2013 |
| JP | 2014-155372 A | 8/2014 |
| WO | 2011/147498 A2 | 12/2011 |

OTHER PUBLICATIONS

Machine translation of Mitsubishi [JP 2014155372 A] (Year: 2014).*
Machine translation of EP 2903139 A1 (Year: 2015).*
International Search Report of PCT/JP2015/056083 dated May 19, 2015, [PCT/ISA/210].
Written Opinion of PCT/JP2015/056083 dated May 19, 2015, [PCT/ISA/237].

* cited by examiner

ROTOR AND MOTOR OF ROTATING ELECTRICAL DEVICE

CROSS REFERENCE TO RELATED APPLICATIONS

This application is a National Stage of International Application No. PCT/JP2015/056083 filed Mar. 2, 2015, the contents of all of which are incorporated herein by reference in their entirety.

TECHNICAL FIELD

This invention relates to a rotor iron core, and a rotor of a rotary electric machine having magnets provided on a rotor iron core, and a motor.

BACKGROUND ART

Conventionally, a surface magnet-type rotor is known in which a rotor iron core is configured by mutually superposing a first rotor iron core in which a plurality of first projecting sections are formed on an outer circumferential section and a second rotor iron core in which a plurality of second projecting sections are formed on an outer circumferential section, and a space is created between the permanent magnets, which are installed on the outer circumferential section of the rotor iron cores, and the first projecting sections by using the second projecting sections to position the permanent magnets in the circumferential direction (see PTL 1).

Furthermore, a rotor manufacturing device is known in the prior art, wherein, in order to install magnets on the outer circumferential section of a rotor iron core, a plurality of magnets accommodated in stacked fashion within left and right restricting members are pressed against the outer circumferential section of a rotor iron core by a pressing rod, and by rotating the rotor iron core in this state, the magnets are supplied one at a time between a plurality of projecting sections which are formed on the outer circumferential section of the rotor iron core (see PTL 2).

CITATION LIST

Patent Literature

[PTL 1] Japanese Patent Application Publication No. 2014-155372
[PTL 2] Japanese Patent Application Publication No. 2013-251968

SUMMARY OF INVENTION

Technical Problem

In this respect, it is considered that the rotor manufacturing device disclosed in PTL 2 is used in order to manufacture the surface magnet-type rotor which is disclosed in PTL 1. However, in the surface magnet-type rotor disclosed in PTL 1, if a step difference occurs between the outer circumferential section of the first projecting sections and the outer circumferential section of the second projecting sections, and/or a step difference occurs between the outer circumferential section of the projecting sections and the outer circumferential section of the permanent magnets, then when the permanent magnets are installed on the outer circumferential section of the rotor iron core by using the rotor manufacturing device disclosed in PTL 2, the permanent magnets may catch on the step difference, permanent magnets may be lost and the manufacture of the rotor may become laborious.

Furthermore, if the height of the projecting sections is lowered, then the step difference between the outer circumferential section of the projecting sections and the outer circumferential section of the permanent magnets becomes lower, but the reluctance torque produced by the projecting sections is reduced. If the structure of the rotary electrical machine is enlarged in order to suppress decrease in the reluctance torque, then the weight of the rotary electrical machine itself becomes greater. In particular, in an electric power steering device for a vehicle, when the weight of the motor, which is a rotary electrical machine, increases, then this leads directly to increase in the weight of the vehicle, which runs counter to the object of improving the fuel consumption of the vehicle.

This invention was devised in order to resolve the problems described above, an object thereof being to achieve a rotor for a rotary electrical machine, and a motor, whereby manufacturing efficiency can be improved while suppressing decline in performance.

Solution to Problem

The rotor of a rotary electrical machine and the motor of the present invention includes: a rotor iron core having an axis line; and a plurality of magnets provided in the rotor iron core, wherein the rotor iron core has first and second iron cores which are mutually superimposed in a direction along the axis line; the first iron core includes a first iron core main body and a plurality of first projecting sections which project to a radial outer side from an outer circumferential section of the first iron core main body and are arranged at intervals apart from each other in a circumferential direction of the first iron core main body; the second iron core includes a second iron core main body, which overlaps with the first iron core main body, and a plurality of second projecting sections which project to a radial outer side from an outer circumferential section of the second iron core main body and are arranged at intervals apart from each other in a circumferential direction of the second iron core main body, in concordance with positions of the first projecting sections; in the rotor iron core, a rotor iron core main body is configured from the first and second iron core main bodies, and projections are configured by the first and second projecting sections which are aligned in a direction along the axis line; the magnets are provided in an outer circumferential section of the rotor iron core main body in a state of being arranged between the projections; when the rotor iron core is viewed along the axis line, portions of the second projecting sections protrude as extension sections outward in the circumferential direction, from the first projecting sections; and, when the rotor iron core is viewed along the axis line, radial-direction outer side end surfaces of the extension parts are smoothly continuous with radial-direction outer side end surfaces of the first projecting sections.

Advantageous Effects of Invention

In the rotor for a rotary electrical machine and the motor according to this invention, the radial-direction outer side end surfaces of the second projecting sections are smoothly continuous with the radial-direction outer side end surfaces of the first projecting sections when the rotor iron core is viewed along the axis line, and therefore it is possible to prevent the occurrence of a step difference between the radial-direction outer side end surfaces of the first and second projecting sections. Consequently, when the magnets are installed on the rotor iron core, it is possible to prevent the magnets from catching on a step difference, even if the height of the projections is not lowered, and therefore it is possible to improve the manufacturing efficiency of the rotor while suppressing decline in the performance of the rotor.

DESCRIPTION OF EMBODIMENTS

A preferred embodiment of this invention is described below with reference to the drawings.

First Embodiment

Figure 1:
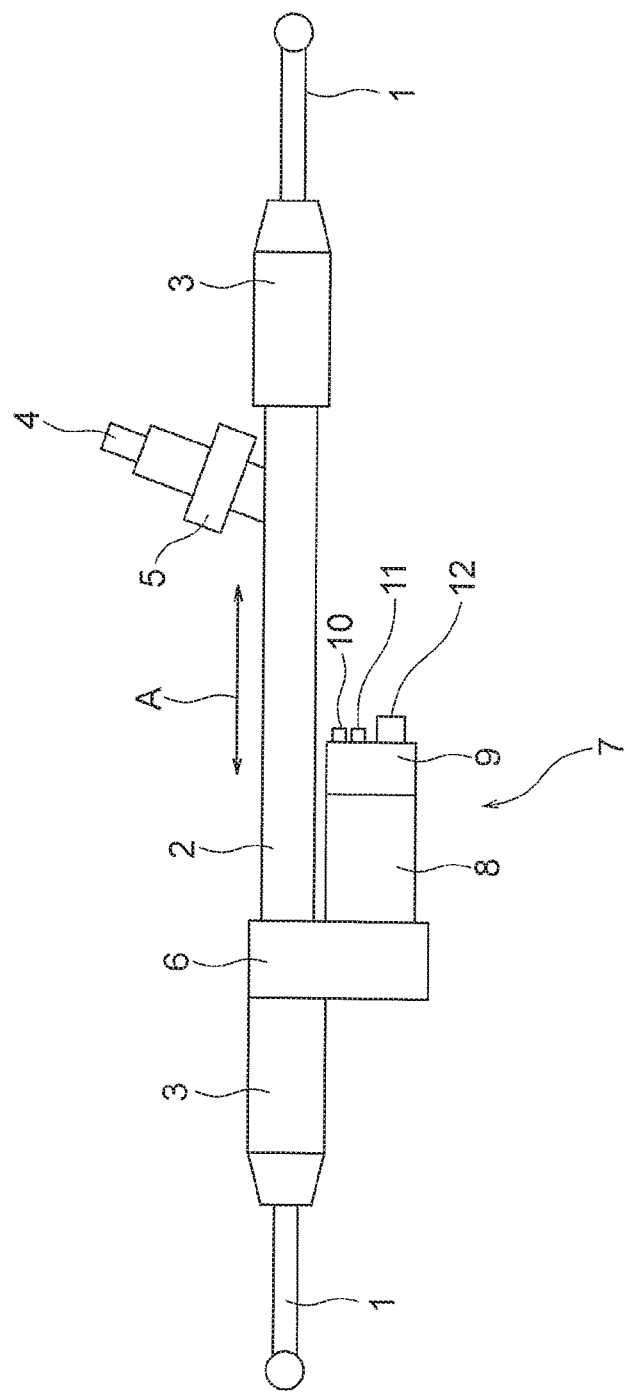
FIG. 1 is a schematic drawing showing an electric power steering device in which a motor according to a first embodiment of the invention is incorporated.

FIG. 1 is a schematic drawing showing an electric power steering device in which a motor according to a first embodiment of the invention is incorporated. The electric power steering device according to the present embodiment is an electric power steering device for a vehicle which is fitted into a vehicle, such as an automobile, for example. A rack shaft (not illustrated) which is accommodated inside a housing 2 is coupled between a pair of tie rods 1. The respective coupling sections between the tie rods 1 and the rack shaft are accommodated inside a rack bush 3 which prevents infiltration of foreign matter into the electric power steering device. A shaft 4 is coupled to the rack shaft. When a driver turns the steering wheel (not illustrated), the torque produced by the steering action is transmitted to the rack shaft via a steering shaft (not illustrated) and the shaft 4. A torque sensor 5 for detecting the torque produced by the steering action of the steering wheel is provided on the shaft 4. Furthermore, an electric drive device 7 is provided on the rack shaft via a gear box 6. In other words, the electric drive device 7 is incorporated into the electric power steering device.

The electric drive device 7 has a motor 8, and an ECU (Electronic Control Unit) 9 which is a control unit provided on the motor 8. The ECU 9 is integrated with the motor 8. Furthermore, the ECU 9 has a control substrate and an inverter circuit. A first connector 10, a second connector 11 and a power source connector 12 are provided on the ECU 9.

Information about the torque detected by the torque sensor 5 is sent as an electrical signal from the torque sensor 5 to the ECU 9 via the first connector 10. The vehicle information, which is information about the velocity of the automobile, etc. is sent as an electrical signal from a sensor (for example, a velocity sensor, etc.) which is installed in the vehicle to the ECU 9 via the second connector 11. A power source (for example, a battery or alternator, etc.) which supplies electricity to the ECU 9 is connected to the power source connector 12. The ECU 9 calculates the required assist torque on the basis of torque information from the torque sensor 5 and vehicle information from the vehicle sensor, and supplies a current corresponding to the assist torque to the motor 8, via the inverter circuit.

The motor 8 generates a torque on the basis of the supply of electricity from the ECU 9. The gear box 6 incorporates a belt and a ball screw (neither illustrated). The torque generated by the motor 8 is decelerated via the gear box 6 and causes the rack shaft to move in the direction of arrow A in FIG. 1. Consequently, the steering force of the driver is assisted by the torque from the motor 8.

When the rack shaft moves in the direction of arrow A, the pair of tie rods 1 move, the tyres are steered, and the vehicle turns. As a result of the assisting of the steering force by the torque of the motor 8, the driver is able to turn the vehicle with a small steering force.

Figure 2:
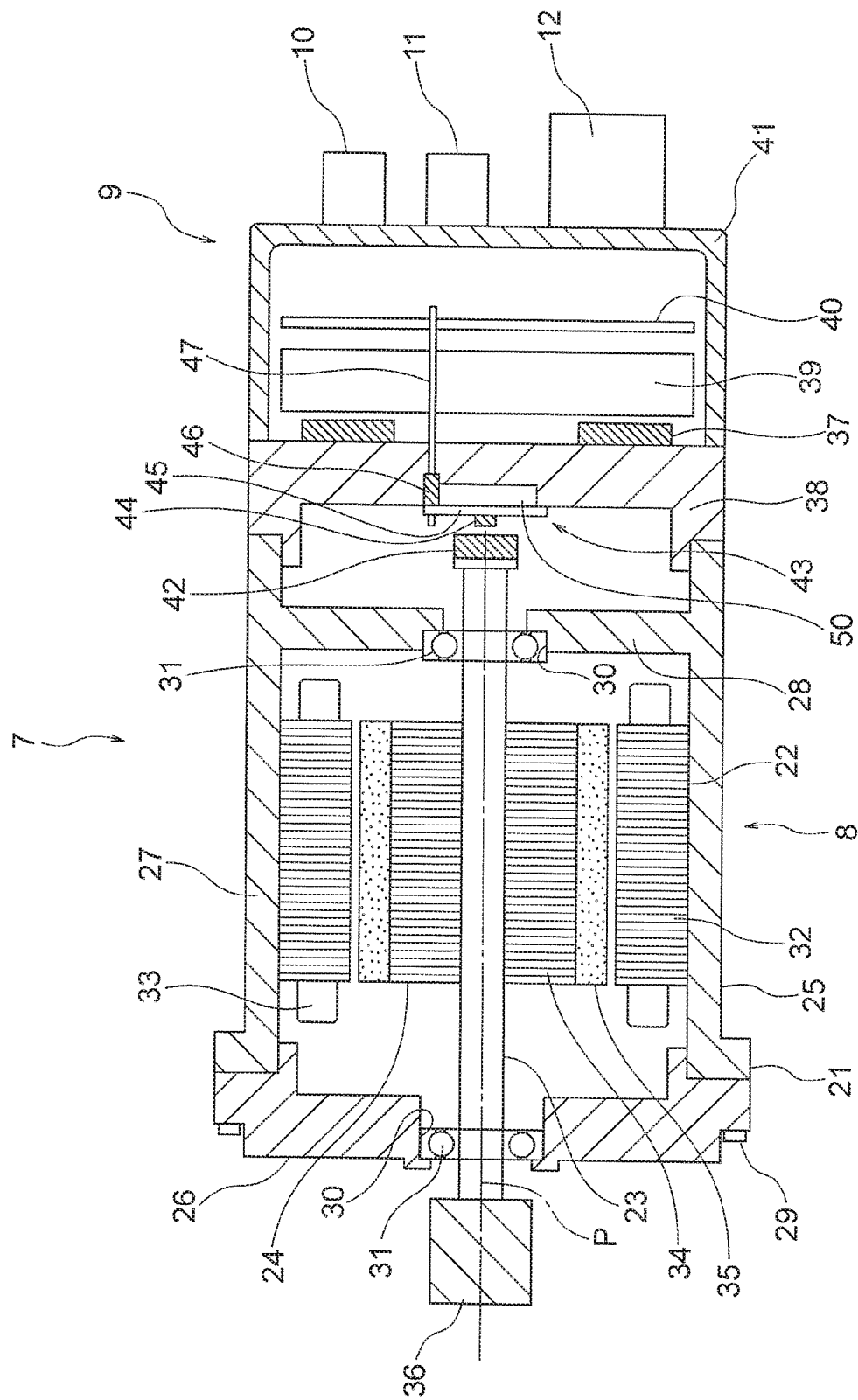
FIG. 2 is a cross-sectional drawing showing the electric drive device in FIG. 1.

FIG. 2 is a cross-sectional diagram showing the electric drive device 7 in FIG. 1. The motor 8 includes a housing 21, a cylindrical stator 22 which is an armature that is fixed inside the housing 21, a shaft 23 which is supported rotatably on the housing 21, and a rotor 24 which is fixed to the shaft 23 and is arranged rotatably inside the stator 22.

The housing 21 includes a first housing member 25 and a second housing member 26. The first housing member 25 includes a cylindrical section 27, and a wall section 28 which closes off an opening at one end of the cylindrical section 27. The cylindrical section 27 and the wall section 28 may be formed in an integrated fashion or may be combined with each other as separate members. The second housing member 26 is installed on the cylindrical section 27 by a bolt 29, in a state of covering an opening in the other end of the cylindrical section 27. The ECU 9 is provided on the end of the cylindrical section 27 which is adjacent to the wall section 28. A through hole 30 through which the shaft 23 is passed is provided respectively in the wall section 28 and the second housing member 26. A bearing 31 for rotatably supporting the shaft 23 is fitted into the respective through holes 30 in the wall section 28 and the second housing member 26.

The stator 22 is fixed to the inner circumferential surface of the cylindrical section 27, coaxially with the axis line P of the shaft 23. Furthermore, the stator 22 has a cylindrical stator iron core 32 and an armature coil 33 which is wound about the stator iron core 32. The stator iron core 32 is configured by layering a plurality of electromagnetic plates in a direction along the axis line P of the shaft 23 (also called "axis line direction" below).

The rotor 24 is arranged coaxially with the axis line P of the shaft 23 via a gap with respect to the inner surface of the stator 22. Furthermore, the rotor 24 includes a rotor iron core 34 which has an axis line that is common with the axis line P, and a plurality of permanent magnets 35 which are provided on the rotor iron core 34. The rotor 24 is fixed to the shaft 23 by press-fitting the rotor iron core 34 into the shaft 23. Consequently, the rotor 24 rotates in unison with the shaft 23.

A pulley 36 is fixed by pressure-fitting onto the end of the shaft 23 on the opposite side from the ECU 9, in other word, the output end of the shaft 23. A belt of the gear box 6 in FIG. 1 is wrapped about the pulley 36. Consequently, the torque of the motor 8 is transmitted to the rack shaft via the gear box 6.

An inverter circuit for driving the motor 8 is included in the ECU 9. The inverter circuit includes a plurality of switching elements (for example, MOST-FETs, etc.) 37. The configuration of the switching element 37 is, for example, a configuration in which a bare chip is mounted on a DBC (Direct Bonded Copper) substrate, or a configuration in which a bare chip is molded in resin to form a module.

Here, the switching element 37 generates heat due to the flow of current for driving the motor 8. Therefore, the switching element 37 has a structure for dissipating heat by being arranged in contact with a heat sink 38, via adhesive and an insulating sheet, etc. The heat sink 38 is fixed to the cylindrical section 27 by, for example, screws or shrink-fitting. Consequently, the heat of the heat sink 38 can be transmitted to the housing 21. Although not illustrated in FIG. 2, apart from the switching element 37, the inverter circuit also includes a smoothing capacitor, a noise reduction coil, a power source relay and a bus bar, etc. for connecting these elements electrically.

The bus bar is molded in an integrated fashion with resin to form an intermediate member 39. A control substrate 40 is adjacent to the intermediate member 39. The control substrate 40 sends a control signal to the switching element 37 in order to drive the motor 8 appropriately, on the basis of the information received from the first connector 10 and the second connector 11.

The inverter circuit and control substrate 40 are covered by a case 41. The case 41 may be made from resin, or a metal such as aluminum, or a combination of resin and a metal, such as aluminum. In this example, the control substrate 40 is disposed in parallel with a flat surface which is perpendicular to the axis line P of the shaft 23 of the motor 8.

A sensor magnet 42, which is a permanent magnet, is provided on the end of the shaft 23 adjacent to the ECU 9. A sensor device 43 which detects the magnetic field of the sensor magnet 42 is provided on the heat sink 38.

The sensor device 43 includes a magnetic sensor 44 which opposes the sensor magnet 42 in the axis line direction, a sensor substrate 45 on which the magnetic sensor 44 is mounted, a support member 46 provided on the sensor substrate 45, and a connecting member 47 which is supported by the support member 46.

A depression section 50 is provided in a portion of the heat sink 38 on the side of the motor 8. The sensor substrate 45 is installed on the heat sink 38 by screws (not illustrated), in a state of covering the depression section 50. Consequently, the distance from the surface of the heat sink 38 to the magnetic sensor 44 is increased.

A connection member 47 is passed through the heat sink 38 and the intermediate member 39 and electrically connects the sensor substrate 45 and the control substrate 40. A hole section (not illustrated) for passing the connection member 47 is provided in the heat sink 38 and the intermediate member 39. A guide (not illustrated) for positioning the connection member 47 is provided in the intermediate member 39. The connection member 47 is electrically connected to the control substrate 40 by, for example, wire bonding, press-fitting or solder, etc. Furthermore, the connection member 47 is electrically connected to the sensor substrate 45 by, for example, press-fitting or solder, etc.

The magnetic sensor 44 detects the magnetic field generated by the sensor magnet 42 and detects the direction of this magnetic field. The sensor device 43 detects the angle of rotation of the rotor 24, by detecting the magnetic field of the sensor magnet 42 and the direction thereof. The ECU 9 supplies a drive current corresponding to the angle of rotation detected by the sensor device 43, to the motor 8.

In FIG. 2, the magnetic sensor 44 is mounted on the sensor substrate 45 which is separate from the control substrate 40, but it is also possible to mount the magnetic sensor 44 on the control substrate 40, and to use the magnetic sensor 44 to detect a magnetic flux leaking out from the sensor magnet 42 and through the heat sink 38. Furthermore, in FIG. 2, the intermediate member 39 is arranged between the heat sink 38 and the control substrate 40, but the positional relationship between the intermediate member 39 and the control substrate 40 may be reversed, and the control substrate 40 may be arranged between the heat sink 38 and the intermediate member 39. Moreover, in FIG. 2, a magnetic sensor is used as a rotation sensor, but it is also possible to use a resolver as a rotation sensor.

Figure 3:
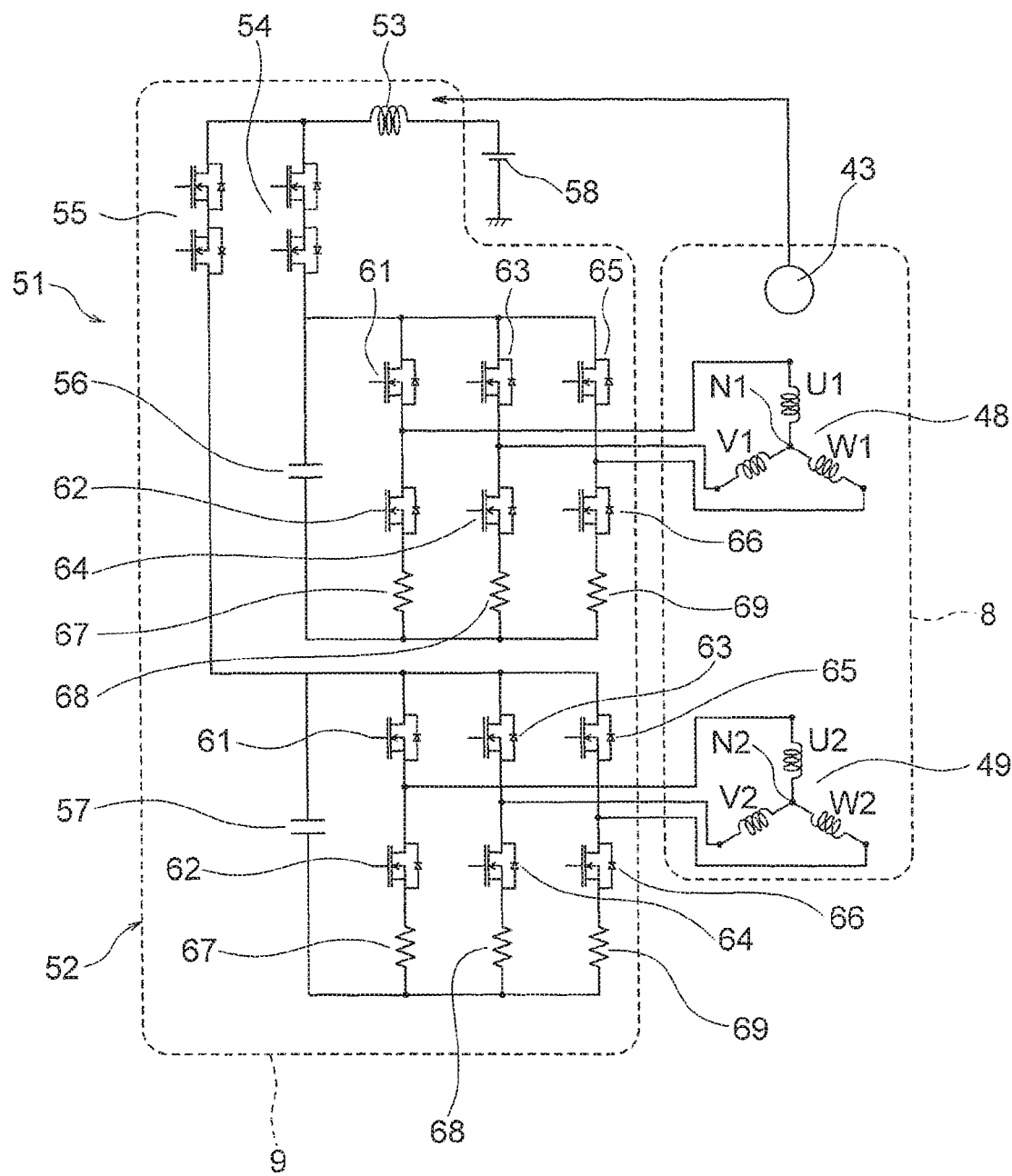
FIG. 3 is an electrical circuit diagram of the electric drive device in FIG. 2.

FIG. 3 is an electrical circuit diagram of the electric drive device 7 in FIG. 2. The armature coil 33 of the motor 8 has a first armature coil 48 which includes a first U-phase coil U1, a first V-phase coil V1 and a first W-phase coil W1, and a second armature coil 49 which includes a second U-phase coil U2, a second V-phase coil V2 and a second W-phase coil W2. In FIG. 3, the first and second armature coils 48, 49 are connected in a Y configuration, but a Δ configuration is also possible. In FIG. 3, only the armature coils are depicted as the configuration of the motor 8, and the remainder of the configuration is omitted.

The inverter circuit of the ECU 9 includes first and second inverters 51, 52, a noise removal coil 53, first and second power source relays 54, 55 and first and second capacitors 56, 57. A three-phase current is supplied from the first inverter 51 to the first armature coil 48 and a three-phase current is supplied from the second inverter 52 to the second armature coil 49.

The noise removal coil 53 is connected electrically to the power source connector 12 in FIG. 2. The first inverter 51 is connected electrically to the noise removal coil 53 via the first power source relay 54, and the second inverter 52 is connected electrically to the noise removal coil 53 via the second power source relay 55. Electric power from the DC power source (for example, a battery, etc.) 58 is supplied to the first and second power source relays 54, 55 via the power source connector 12 and the noise removal coil 53.

The first and second power source relays 54, 55 are each configured by two MOST-FETs. The first and second power source relays 54, 55 are configured so as to be opened in the event of a failure, etc., in order that excessive current does not flow to the first and second inverters 51, 52. In FIG. 3, the first and second power source relays 54, 55 are connected on the opposite side of the power source 58 as viewed from the noise removal coil 53, but the first and second power source relays 54, 55 may also be connected to the near side of the power source 58 as viewed from the noise removal coil 53.

The first and second inverters 51, 52 each have six MOST-FETs 61 to 66, which are a plurality of switching elements constituting a bridge. In each of the first and second inverters 51, 52, the first and second MOST-FETs 61, 62 which are mutually connected in series, third and fourth MOST-FETs 63, 64 which are mutually connected in series, and fifth and sixth MOST-FETs 65, 66 which are mutually connected in series, are connected to each other in parallel. Furthermore, in each of the first and second inverters 51, 52, one first shunt resistance 67 is connected to the GND (ground) side of the second MOST-FET 62, one second shunt resistance 68 is connected to the GND side of the fourth MOST-FET 64 and one third shunt resistance 69 is connected to the GND side of the sixth MOST-FET 66. The first to third shunt resistances 67 to 69 are used to detect current values. In this example, three shunt resistances 67 to 69 are provided in each of the first and second inverters 51, 52, but it is also possible to detect current even if the number of the shunt resistances provided in the first and second inverters 51, 52 is two or one, and therefore the number of the shunt resistances in each of the first and second inverters 51, 52 may be set to two or one.

As illustrated in FIG. 3, the current from the first inverter 51 to the motor 8 is supplied respectively to a U1 phase of the motor 8 via the bus bar, etc. from between the first and second MOST-FETs 61, 62 of the first inverter 51, to a V1 phase of the motor 8 via the bus bar, etc. from between the third and fourth MOST-FETs 63, 64 of the first inverter 51, and to a W1 phase of the motor 8 via the bus bar, etc. from between the fifth and sixth MOST-FETs 65, 66 of the first inverter 51.

As illustrated in FIG. 3, the current from the second inverter 52 to the motor 8 is supplied respectively to a U2 phase of the motor 8 via the bus bar, etc. from between the first and second MOST-FETs 61, 62 of the second inverter 52, to a V2 phase of the motor 8 via the bus bar, etc. from between the third and fourth MOST-FETs 63, 64 of the second inverter 52, and to a W2 phase of the motor 8 via the bus bar, etc. from between the fifth and sixth MOST-FETs 65, 66 of the second inverter 52.

In the first inverter 51, the first capacitor 56 is connected in parallel to the first MOST-FET 61, the second MOST-FET 62 and the first shunt resistance 67. Furthermore, in the second inverter 52, the second capacitor 56 is connected in parallel to the first MOST-FET 61, the second MOST-FET 62 and the first shunt resistance 67. The first and second capacitors 56, 57 are smoothing capacitors. In FIG. 3, a single first capacitor 56 and a single capacitor 56 are provided, but it is also possible to connect a plurality of first capacitors 56 in parallel with the first inverter 51, and to connect a plurality of second capacitors 57 in parallel with the second inverter 52.

Furthermore, in FIG. 3, a motor relay which electrically disconnects the motor 8 and the first and second inverters 51, 52 in the event of a fault is not depicted, but the motor relay may be provided at the neutral points N1, N2 of the first and second armature coils 48, 49, and the motor relay may be provided respectively between the motor 8 and the first and second inverters 51, 52.

The ECU 9 sends a signal corresponding to an angle of rotation detected by the sensor device 43, as a control signal, to the first and second inverters 51, 52 respectively, from the control substrate 40 in FIG. 2, and supplies three-phase current to each of the first and second armature coils 48, 49, by switching the first to sixth MOST-FETs 61 to 66 respectively in the first and second inverters 51, 52.

Figure 4:
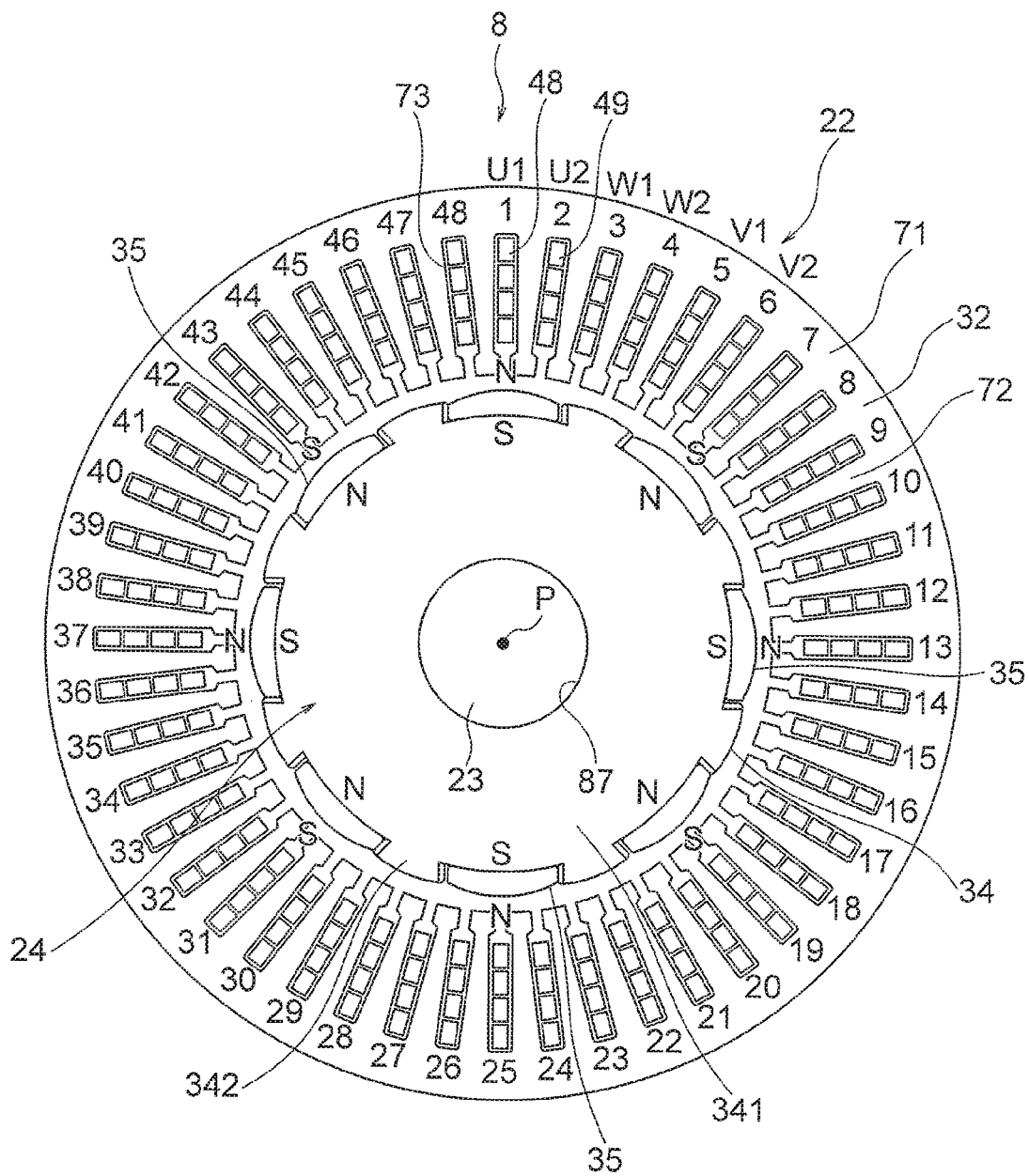
FIG. 4 is a cross-sectional drawing showing a motor in FIG. 2.

FIG. 4 is a cross-sectional diagram showing the motor 8 in FIG. 2. The stator iron core 32 includes a cylindrical core back 71 and a plurality of teeth 72 which project in an inward circumferential direction from the core back 71. The teeth 72 are arranged at intervals apart in the circumferential direction of the stator iron core 32. Slots 73 are formed between mutually adjacent teeth 72. The first and second armature coils 48, 49 are accommodated inside the slots 73. Although not illustrated in the drawings, insulating paper, etc. is inserted in between each of the first and second armature coils 48, 49 and the stator iron core 32, thereby ensuring electrical insulation.

In this example, the number of the teeth 72 is 48. Therefore, the number of the slots 73 is also 48. Four conducting wires of the first or second armature coil 48, 49 are accommodated in each slot 73.

The first armature coil 48 is configured by three phases, which are a U1 phase, a V1 phase and a W1 phase, and the second armature coil 49 is configured by a U2 phase, a V2 phase and a W2 phase. As illustrated in FIG. 4, the arrangement of the first and second armature coils 48, 49 is U1, U2, W1, W2, V1, V2, in order from the first slot 73, and then U1, U2, W1, W2, V1, V2, in order from the seventh slot onwards and so on in a similar order until the 48th slot.

The first and second armature coils 48, 49 are arranged in such a manner that the directions of the current in the U1 phase in the first slot 73 and the U1 phase in the seventh slot 73 are mutually opposite. In other words, the first and second armature coils 48, 49 have a distributed winding configuration and are wound from the first slot 73 to the seventh slot 73, thus spanning a total of six teeth 72. This corresponds to an electrical angle of 180°, and since the short-pitch winding coefficient is 1, then the magnetic flux generated by the permanent magnets 35 can be utilized efficiently, the compact high-torque motor 8 is obtained, and since the amount of the permanent magnets 35 can be reduced, then it is possible to reduce costs in comparison with a motor having a small winding coefficient.

Figure 5:
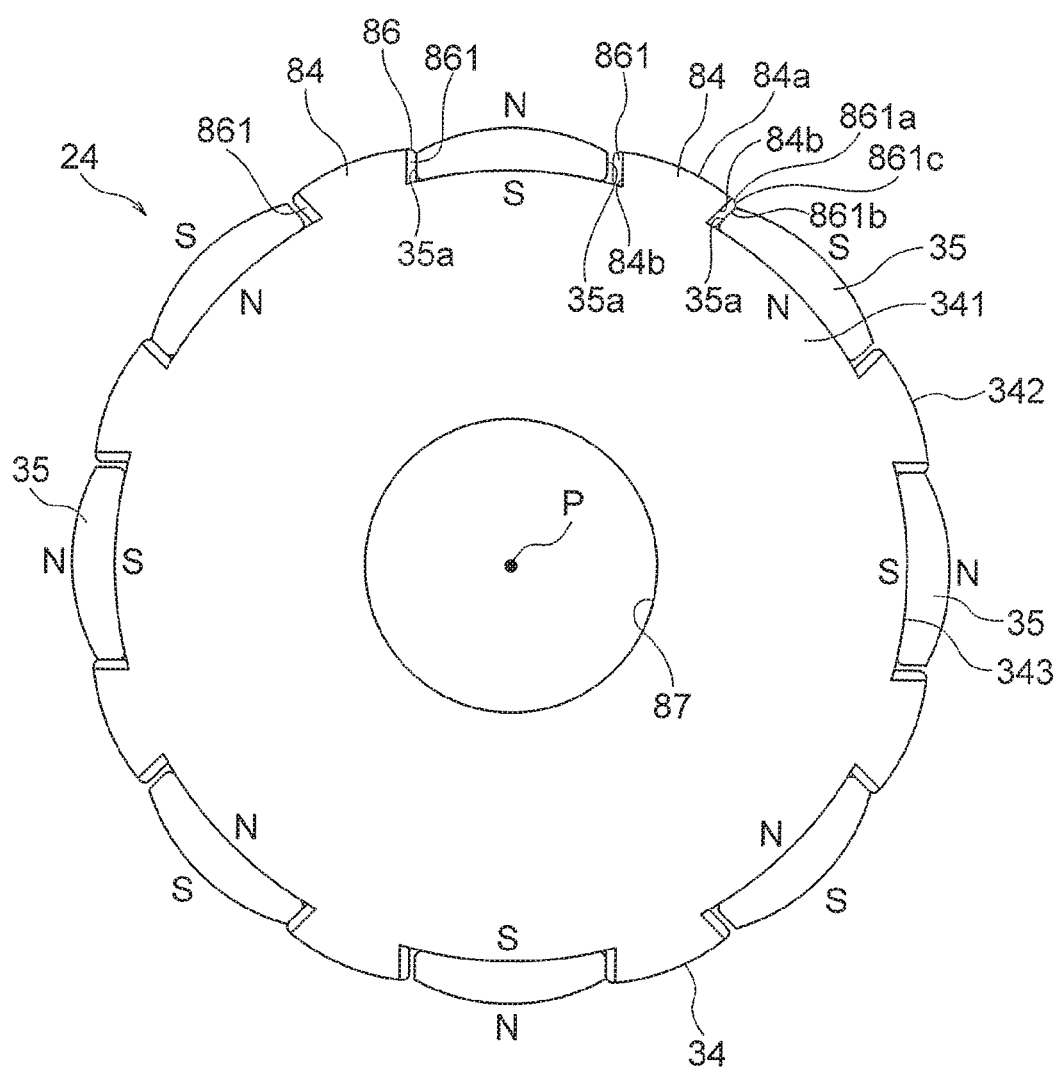
FIG. 5 is a cross-sectional drawing showing a rotor in FIG. 4.
Figure 6:
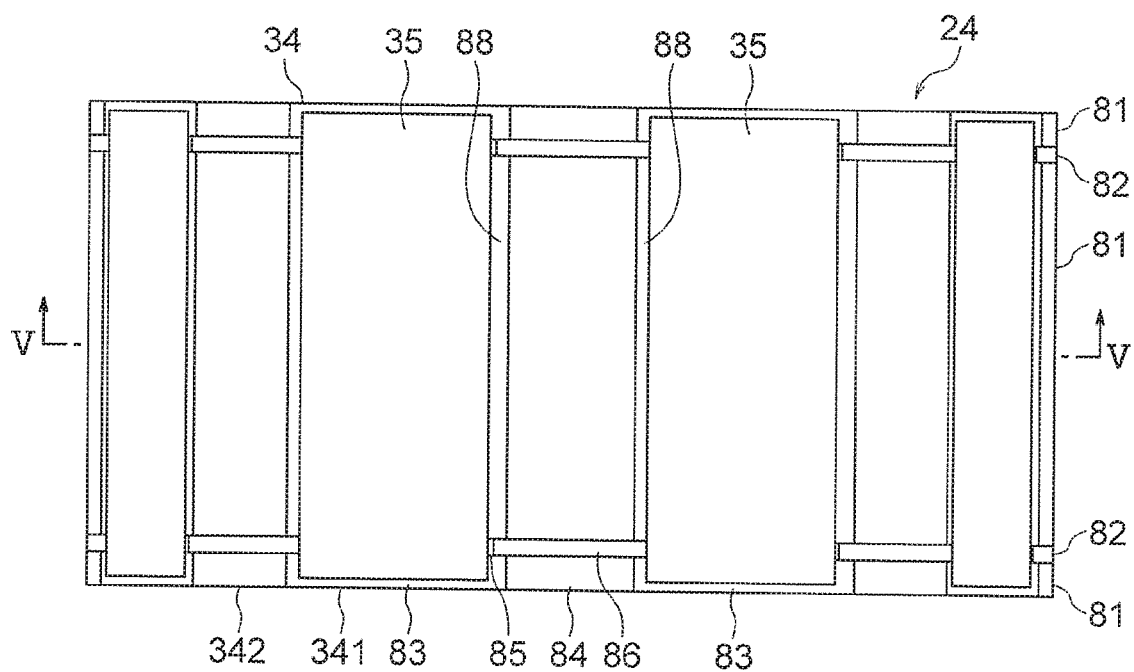
FIG. 6 is a side view diagram showing the rotor in FIG. 5.

FIG. 5 is a cross-sectional diagram showing the rotor 24 in FIG. 4. Furthermore, FIG. 6 is a side view diagram showing the rotor 24 in FIG. 5. FIG. 5 is a cross-sectional diagram along line V-V in FIG. 6. As illustrated in FIG. 6, the rotor iron core 34 includes a plurality of first iron cores 81 and a plurality of second iron cores 82 which are stacked mutually in a direction along the axis line P of the rotor iron core 34. In the rotor iron core 34, the first and second iron cores 81, 82 are stacked alternately.

In this example, the number of the first iron cores 81 in the direction along the axis line P is three and the number of the second iron cores 82 is two. Furthermore, in this example, the dimension of each of the first iron cores 81 in the direction along the axis line P is greater than the dimension of each of the second iron cores 82 in the direction along the axis line P. Moreover, in this example, the sum of the dimensions of the respective first iron cores 81 in the direction along the axis line P is greater than the sum of the dimensions of the respective second iron cores 82 in the direction along the axis line P.

The first iron cores 81 each include a cylindrical first iron core main body 83, and a plurality of first projecting sections 84 which project in the outward radial direction of the rotor iron core 34 from the outer circumferential section of the first iron core main body 83. The plurality of first projecting sections 84 are arranged at intervals apart from each other in the circumferential direction of the first iron core main body 83. In this example, the number of the first projecting sections 84 is taken to be eight.

The second iron cores 82 each include a cylindrical second iron core main body 85, and a plurality of second projecting sections 86 which project in the outward radial direction of the rotor iron core 34 from the outer circumferential section of the second iron core main body 85. The second iron core main bodies 85 overlap completely with the first iron core main bodies 83 in a direction along the axis line of the rotor iron core 34. The number of the second projecting sections 86 is the same as the number of the first projecting sections 84. Therefore, in this example, the number of the second projecting sections 86 is taken to be eight. Furthermore, the plurality of second projecting sections 86 are arranged at intervals apart from each other in the circumferential direction of the second iron core main body 85, in concordance with the positions of the first projecting sections 84.

In the rotor iron core 34, a rotor iron core main body 341 is constituted by the first and second iron core main bodies 83, 85, and projections 342 are constituted by the first and second projecting sections 84, 86 which are aligned in a direction along the axis line P of the rotor iron core 34. Accordingly, in the rotor iron core 34, a plurality of projections 342 along the axis line P of the rotor iron core 34 are provided at intervals apart from each other in the circumferential direction of the rotor iron core 34, on the outer circumferential section of the cylindrical rotor iron core main body 341. Furthermore, recess sections 343 are formed between the projections 342. In this example, eight projections 342 are provided at even intervals apart in the circumferential direction of the rotor iron core 34, on the outer circumferential section of the rotor iron core main body 341. Consequently, the number of the recess sections 343 formed between the projections 342 is eight.

A through hole 87 for passing the shaft 23 is provided along the axis line P of the rotor iron core 34, in the centre of the rotor iron core main body 341. When the shaft 23 is passed through the through hole 87, the axis line P of the rotor iron core 34 coincides with the axis line P of the shaft 23.

The permanent magnets 35 are installed on the outer circumferential section of the rotor iron core main body 341 so as to be arranged respectively in the plurality of recess sections 343. Consequently, in this example, eight permanent magnets 35 are arranged at intervals apart in the circumferential direction of the rotor iron core 34. Furthermore, the polarities of mutually adjacent permanent magnets 35 are opposite to each other. In other words, in this example, the rotor 24 is an 8-pole rotor. Furthermore, the radial-direction outer side end surfaces of the permanent magnets 35 constitute an arc shape which rises up in the outward radial direction of the rotor iron core 34, when the permanent magnets 35 are viewed along the axis line P. The rotor 24 also has a stainless steel cylindrical protection tube (not illustrated) which encloses the rotor iron core 34 and the permanent magnets 35, while making contact with the radial-direction outer side end surfaces of the projections 342 and the radial-direction outer side end surfaces of the permanent magnets 35 in the radial direction.

The dimension of the second projecting sections 86 in the circumferential direction of the rotor iron core 34 (in other words, the circumferential-direction dimension of the second projecting sections 86) is greater than the dimension of the first projecting sections 84 in the circumferential direction of the rotor iron core 34 (in other words, the circumferential-direction dimension of the first projecting sections 84). Consequently, when the rotor iron core 34 is viewed along the axis line P of the rotor iron core 34, portions of the second projecting sections 86 (in other words, both ends of the second projecting sections 86 in the circumferential direction) protrude as a pair of extension parts 861 in an outward circumferential direction, from the circumferential-direction end surfaces 84b of the first projecting section 84. Furthermore, when the rotor iron core 34 is viewed along the axis line P of the rotor iron core 34, the shape of the radial-direction outer side end surfaces of the first and second projecting sections 84, 86 constitutes an arc shape which rises up in the outward radial direction of the rotor iron core 34.

In each of the extension parts 861, when the rotor iron core 34 is viewed along the axis line P of the rotor iron core 34, as illustrated in FIG. 5, the radial-direction outer side end surface 861a of the extension part 861, and the circumferential-direction end surface 861b of the extension part 861 are continuous via a curved surface 861c. On the other hand, at the boundary between the radial-direction outer side end surface 84a of the first projecting section 84 and the circumferential-direction end surface 84b of the first projecting section 84, a boundary lines is formed along the axis line P, without an interposing curved surface. Furthermore, in the same projection 342, when the rotor iron core 34 is viewed along the axis line P of the rotor iron core 34, the radial-direction outer side end surfaces 861a of the extension parts 861 are smoothly continuous with the radial-direction outer side end surfaces 84a of the first projecting section 84. Moreover, when the rotor iron core 34 is viewed along the axis line P of the rotor iron core 34, the portion of the radial-direction outer side end surface of each second projecting section 86 apart from the radial-direction outer side end surfaces 861a of the extension parts 861, in other words, the central portion of the radial-direction outer side end surface of the second projecting section 86, overlaps with the radial-direction outer side end surface 84a of the first projecting section 84.

As shown in FIG. 6, spaces 88 are formed between the circumferential-direction end surfaces 84b of the first projecting sections 84 and the permanent magnets 35. Furthermore, the circumferential-direction end surfaces 35a of each permanent magnet 35 contact the circumferential-direction end surface 861b of one extension part 861, of the two extension parts 861 which are situated on either side of the second recess section 343 in the circumferential direction, whereas a gap is formed between the permanent magnet 35 and the circumferential-direction end surface 861b of the other extension part 861. Consequently, even if a force is applied to the permanent magnet 35 in a direction towards the circumferential-direction end surface 84b of the first projecting section 84, due to the contact of the permanent magnet 35 against the circumferential-direction end surface 861b of the extension part 861, the permanent magnet 35 is prevented from approaching the circumferential-direction end surface 84b of the first projecting section 84, and a certain space is ensured between the first projecting section 84 and the permanent magnet 35. In FIG. 5, each of the permanent magnets 35 contacts the extension part 861 on the left-hand side. The height of the circumferential-direction end surfaces 84b of the first projecting section 84 is greater than the height of the circumferential-direction end surfaces 35a of the permanent magnet 35. Furthermore, the height of the circumferential-direction end surfaces 861b of the extension parts 861 of the second projecting section 86 is greater than the height of the circumferential-direction end surfaces 35a of the permanent magnet 35.

In this example, the bottom surface of each recess section 343, in other words, the installation surface for the permanent magnet 35, is a curved surface. Consequently, in this example, the cross-sectional shape of the permanent magnet 35 is a shape in which the radial-direction inner side end surface and the radial-direction outer side end surface are both curved surfaces. Under conditions where the radius of curvature of the radial-direction outer side end surface of each permanent magnet 35 and the width dimension of the permanent magnet 35 are the same, if the radial-direction inner side end surface and the radial-direction outer side end surface of the permanent magnet 35 are both configured as curved surfaces, then it is possible to reduce the thickness of the permanent magnet 35 generally, compared to when the radial-direction inner side end surface of the permanent magnet 35 is flat. Therefore, the air gaps of the permanent magnets 35 can be reduced, and the inductance can be increased. Consequently, the effects of weak magnetic flux control can readily be achieved, and the torque in the event of high-speed rotation can be improved. It is also possible to form the bottom surface of each recess section 343 as a flat surface, and to form the radial-direction outer side end surface of the permanent magnet 35 as a curved surface and the radial-direction inner side end surface of the permanent magnet 35 as a flat surface.

Figure 7:
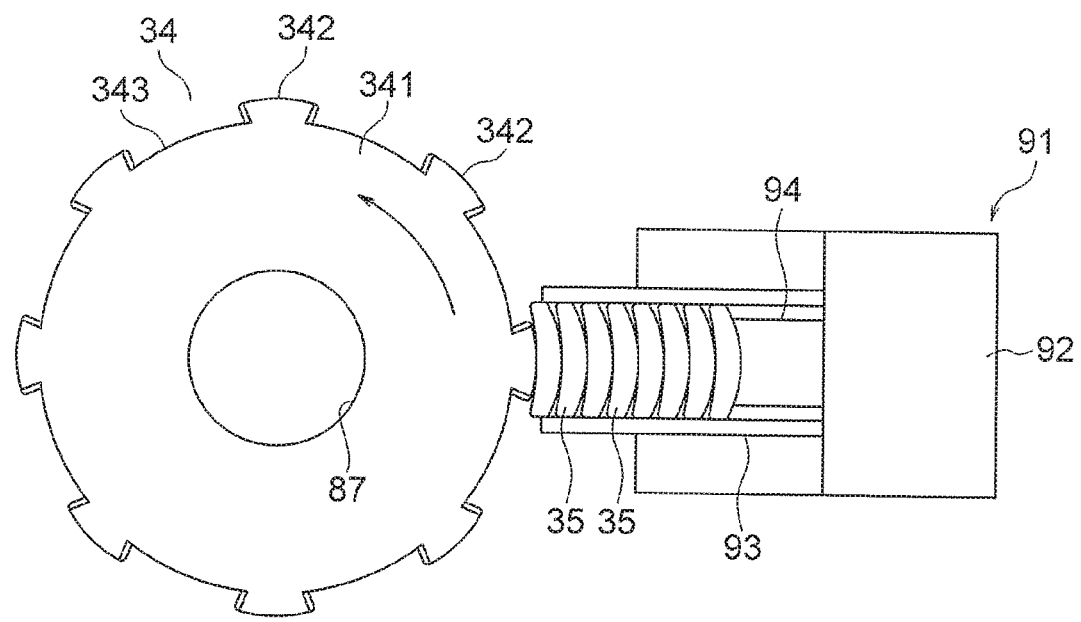
FIG. 7 is a diagram illustrating a state where a permanent magnet in FIG. 5 is pressed against the radial-direction outer side end surface of a projection.
Figure 8:
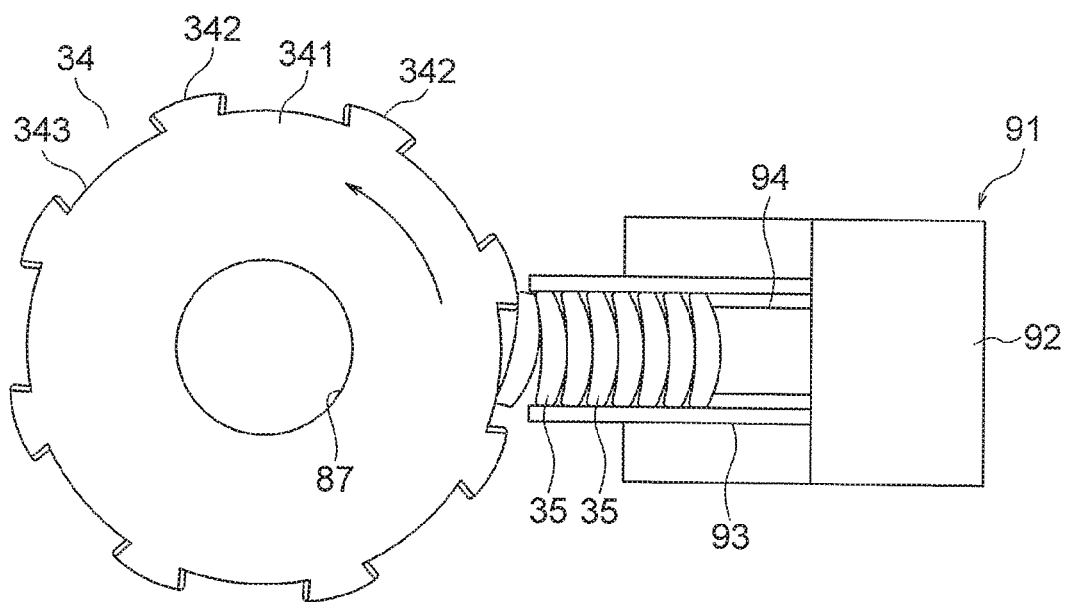
FIG. 8 is a diagram illustrating a state where the permanent magnet in FIG. 7 is tilted and has made contact with the bottom surface of a recess section.
Figure 9:
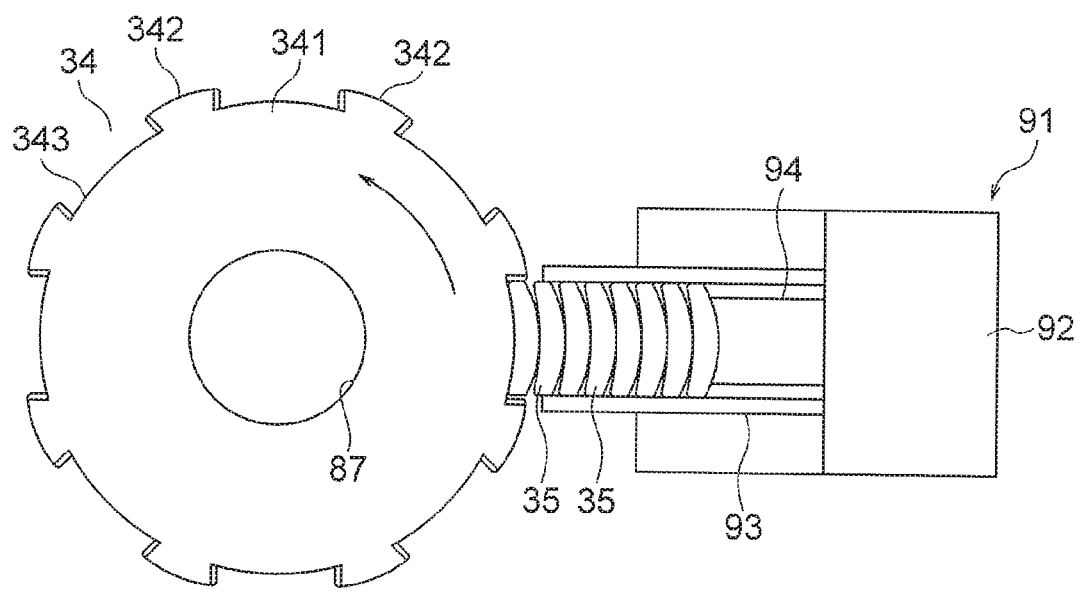
FIG. 9 is a diagram showing a state where the permanent magnet in FIG. 8 has been arranged inside a recess section.
Figure 10:
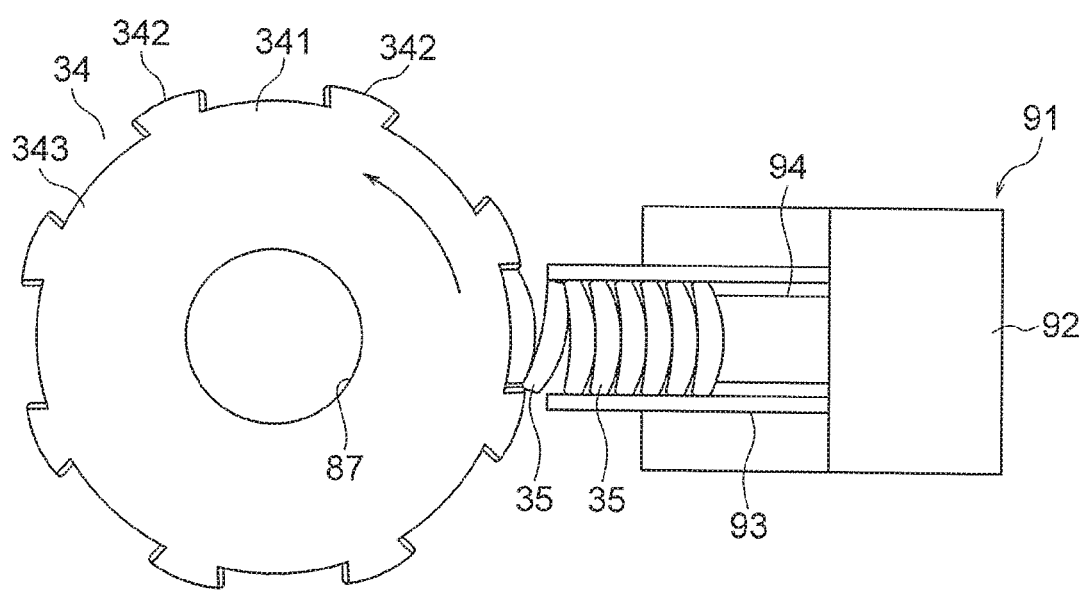
FIG. 10 is a diagram illustrating a state where a second permanent magnet in FIG. 9 is sliding over a first permanent magnet.

Next, the procedure for manufacturing the rotor 24 by installing the permanent magnets 35 on the rotor iron core 34 will be described. FIG. 7 to FIG. 10 are schematic drawings for describing a procedure for installing the permanent magnets 35 in FIG. 5 on the rotor iron core 34. In other words, FIG. 7 shows a state where the permanent magnets 35 in FIG. 5 are pressed against the radial-direction outer side end surface of the projections 342, FIG. 8 shows a state where the permanent magnet 35 in FIG. 7 has tilted and the end of the permanent magnet 35 has contacted the bottom surface of the recess section 343, FIG. 9 shows a state where the permanent magnet 35 in FIG. 8 is arranged inside the recess section 343, and FIG. 10 shows a state where the second permanent magnet 35 in FIG. 9 slides over the first permanent magnet 35. When installing the permanent magnets 35 on the rotor iron core 34, a magnet installation device 91 is used.

The magnet installation device 91 has a base 92, a cylindrical guide member 93 fixed to the base 92, and a pressing body 94 which is provided inside the guide member 93. The magnet installation device 91 is arranged with the opening of the guide member 93 facing the outer circumferential section of the rotor iron core 34. The guide member 93 is arranged along a direction perpendicular to the axis line P.

The plurality of permanent magnets 35 are accommodated in stacked fashion inside the guide member 93. In the guide member 93, the permanent magnets 35 are mutually stacked in order from the first permanent magnet 35 to the nth permanent magnet 35, from the opening of the guide member 93. n is an integer equal to or greater than 2. The permanent magnets 35 pass through the opening of the guide member 93 from inside the guide member 93 and project outside the guide member 93, in order, from the first permanent magnet 35. The pressing body 94 generates a pressing force which presses the plurality of stacked permanent magnets 35 towards the outside of the guide member 93. For example, a spring, etc. is used as the pressing body 94.

When installing the permanent magnets 35 on the rotor iron core 34, firstly, an adhesive is applied to each of the recess sections 343. Furthermore, as illustrated in FIG. 7, the first permanent magnet 35 which is situated at the opening of the guide member 93, of the plurality of permanent magnets 35 inside the guide member 93, is made to contact the radial-direction outer side end surface of the projection 342. Thereby, the first permanent magnet 35 is pressed against the projection 342 by the pressing force of the pressing body 94.

Figure 11:
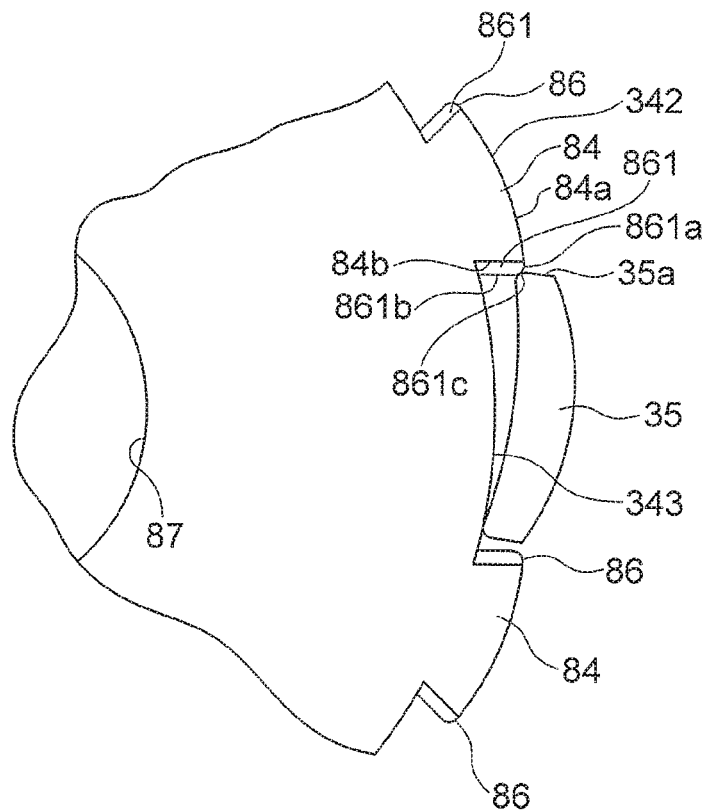
FIG. 11 is a principal enlarged diagram illustrating the permanent magnet and a rotor iron core in FIG. 8.

Subsequently, when the rotor iron core 34 is rotated, the first permanent magnet 35 slides over the radial-direction outer side end surface of the projection 342 and moves towards the recess section 343, while being pressed by the pressing force of the pressing body 94 against the radial-direction outer side end surface of the projection 342. Accordingly, as illustrated in FIG. 8, while one end section of the permanent magnet 35 remains in contact with the projection 342, the permanent magnet 35 tilts and the other end section of the permanent magnet 35 contacts the bottom surface of the recess section 343. In this case, as illustrated in FIG. 11, the permanent magnet 35 contacts only the extension part 861 of the second projecting section 86, among the first and second projecting sections 84, 86.

Thereupon, when the rotor iron core 34 is rotated further, as illustrated in FIG. 9, one end section of the permanent magnet 35 which is engaged with the extension part 861 of the second projecting section 86 slides down into the recess section 343, and the circumferential-direction end surface 35a of the permanent magnet 35 becomes fixed inside the recess section 343 in a state of contact with the circumferential-direction end surface 861b of the extension part 861.

In this case, displacement of the permanent magnet 35 in a direction towards the first projecting section 84 is inhibited by the extension part 861 and the space 88 is created between the circumferential-direction end surface 84b of the first projecting section 84 and the circumferential-direction end surface 35a of the permanent magnet 35. Consequently, the amount of magnetic flux leaking from the permanent magnet 35 and into the first projecting section 84 is suppressed, and therefore decline in the magnetic torque due to increase in the amount of magnetic flux leaking from the permanent magnet 35 is suppressed.

Furthermore, in this case, since the one end section of the permanent magnet 35 drops into the recess section 343 while sliding along the curved surface 861c of the extension part 861, then the shock on the permanent magnet 35 upon dropping into the recess section 343 is alleviated, and the occurrence of damage to the permanent magnet 35 is prevented. If damage to the permanent magnet 35 occurs, then shards of magnet produced by the damage may become sandwiched between the permanent magnet 35 and the inner surface of the recess section 343 (for example, the bottom surface or side surface of the recess section 343, etc.) and the permanent magnet 35, and press-fitting defects of the protective tube may arise due to floating up of the permanent magnets 35, or imbalance in the rotation of the rotor 24 may occur due to displacement of the attachment position of the permanent magnets 35, but in the present embodiment this can be eliminated, and therefore it is possible to reduce losses caused by disposal of components. Furthermore, since the permanent magnet 35 drops into the recess section 343 while sliding along the curved surface 861c of the extension part 861, then there is no need to provide a curved surface at the boundary between the radial-direction outer side end surface 84a of the first projecting section 84 and the circumferential-direction end surface 84b. Consequently, it is possible to prevent decline in the volume of the first projecting section 84, and it is possible to prevent decrease in the reluctance produced by the first projecting section 84.

Figure 12:
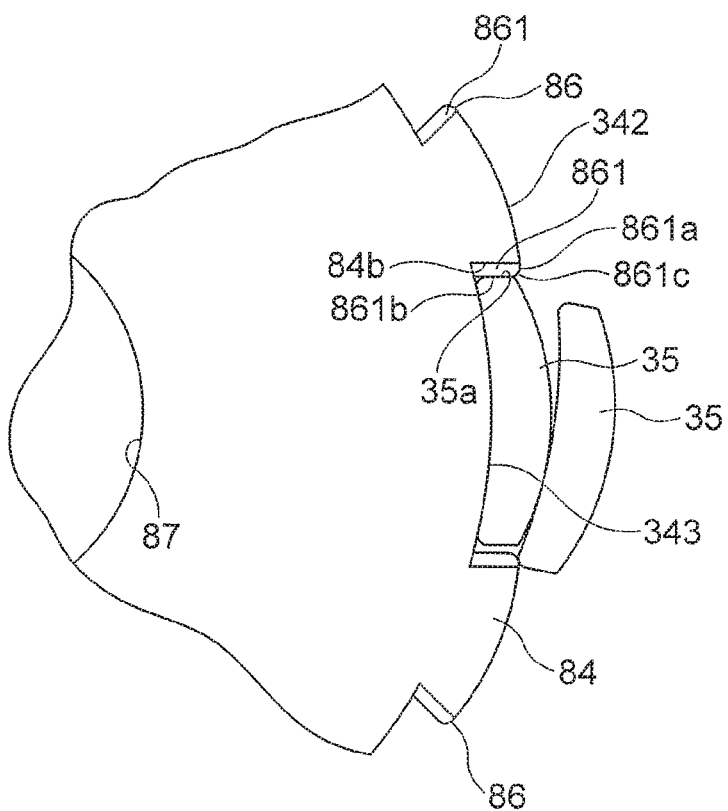
FIG. 12 is a principal enlarged diagram illustrating the permanent magnet and the rotor iron core in FIG. 10.

When the rotor iron core 34 is rotated further subsequently, then the second permanent magnet 35 which is accommodated inside the guide member 93 moves while sliding over the radial-direction outer side end surface of the first permanent magnet 35 which has been installed inside a recess section 343. Consequently, as illustrated in FIG. 12, the end section of the second permanent magnet 35 contacts the radial-direction outer side end surface 861a of the adjacent extension part 861. When the rotor iron core 34 is rotated further subsequently, the second permanent magnet 35 moves while sliding in sequence over the radial-direction outer side end surface 861a of the extension part 861 and the radial-direction outer side end surface 84a of the first projecting section 84, and the second permanent magnet 35 is pressed against the radial-direction outer side end surface of the next projection 342.

Here, supposing a case where there is no extension part 861, since the circumferential-direction dimension of the first projecting section 84 is normally smaller than the circumferential-direction dimension of the permanent magnet 35, then if the radius of curvature of the radial-direction outer side end surface of the permanent magnet 35 and the radius of curvature of the radial-direction outer side end surface 84a of the first projecting section 84 are approximately the same, the height of the circumferential-direction end surface 84b of the first projecting section 84 will be greater than the height of the circumferential-direction end surface 35a of the permanent magnet 35. Consequently, a step difference occurs between the first permanent magnet 35 and the first projecting section 84. Furthermore, there is a space between the circumferential-direction end surface 84b of the first projecting section 84 and the circumferential-direction end surface 35a of the first permanent magnet 35. For this reason, if there is no extension part 861, then the second permanent magnet 35 which is sliding over the first permanent magnet 35 is liable to catch on the first projecting section 84. Consequently, installation defects of the permanent magnets 35 occur, and the production yield becomes worse. Furthermore, if the circumferential-direction dimension of the first projecting section 84 is made larger and the space between the circumferential-direction end surface 84b of the first projecting section 84 and the circumferential-direction end surface 35a of the first permanent magnet 35 becomes smaller, then the magnetic flux leaking from the permanent magnet 35 into the first projecting section 84 becomes greater, and the magnetic torque declines. On the other hand, in the present embodiment, catching of the second permanent magnet 35 on the first projecting section 84 while sliding over the first permanent magnet 35 is avoided by the extension part 861, and therefore it is possible to achieve smooth movement of the second permanent magnet 35 while ensuring the space between the first projecting section 84 and the permanent magnet 35.

Thereafter, a similar procedure to that of the first permanent magnet 35 is repeated and all of the permanent magnets 35 are installed in all of the recess sections 343. In this way, the rotor 24 is manufactured.

In the rotor 24 and the motor 8 of this kind, when the rotor iron core 34 is viewed along the axis line P, the radial-direction outer side end surfaces 861a of the extension parts 861 of the second projecting sections 86 are smoothly continuous with the radial-direction outer side end surfaces 84a of the first projecting sections 84, and therefore it is possible to prevent catching of the permanent magnets 35 on the projections 342 while sliding over the projections 342 in the circumferential direction of the rotor iron core 34. Furthermore, when the second permanent magnet 35 sliding over the first permanent magnet 35 is moved to the projection 342, it is possible to prevent catching of the second permanent magnet 35 on the first projecting section 84, by the extension part 861. Accordingly, it is possible to carry out the task of installing the permanent magnets 35 on the rotor iron core 34, easily and smoothly, and the manufacturing efficiency of the rotor 24 can be improved. Moreover, since catching of the permanent magnets 35 on the first projecting sections 84 is prevented by the extension parts 861, then it is not necessary to lower the height of the first projecting sections 84. Furthermore, it is possible to ensure a space between the circumferential-direction end surfaces 84b of the first projecting sections 84 and the circumferential-direction end surfaces 35a of the permanent magnets 35, by the extension parts 861. Consequently, it is possible to suppress any decline in the reluctance torque and magnetic torque of the motor 8, and decline in the performance of the motor 8 can be suppressed.

Moreover, the dimension of the first projecting section 84 in the direction along the axis line P is greater than the dimension of the second projecting section 86 in the direction along the axis line P, and therefore it is possible to increase the range of the space 88 between each permanent magnet 35 and the first projecting section 84, in the direction along the axis line P. Therefore, decline in the magnetic torque of the motor 8 can be further suppressed and decline in the performance of the motor 8 can be further suppressed.

Furthermore, since the motor 8 is incorporated into an electric power steering device for a vehicle, then it is possible to increase manufacturing efficiency and suppress decline in performance in an electric power steering device.

Figure 13:
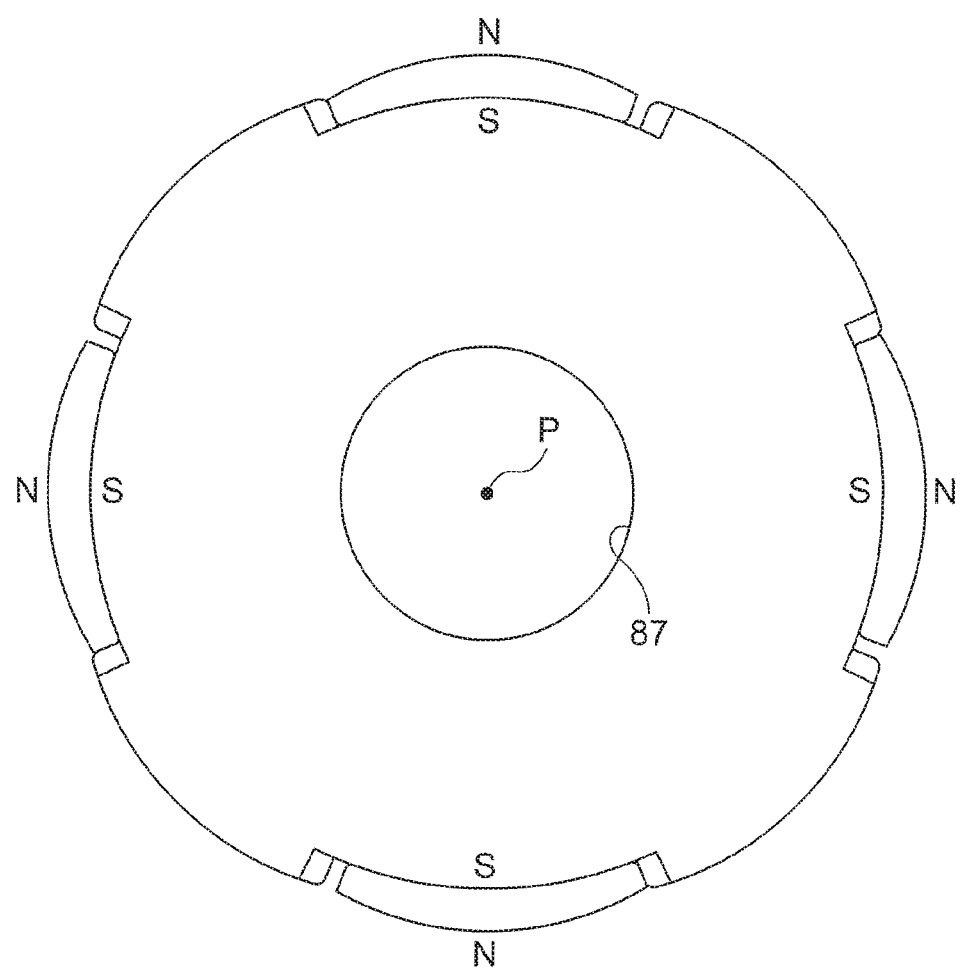
FIG. 13 is a cross-sectional diagram showing a further example of the rotor according to the first embodiment of this invention.

In the example described above, this invention is applied to the rotor 24 in which the polarities of the permanent magnets 35 which are mutually adjacent in the circumferential direction are different to each other, and to the motor 8 which has the rotor 24, but as illustrated in FIG. 13, the invention may be applied to a consequent pole type of rotor in which mutually different polarities are formed between the plurality of permanent magnets 35 having the same polarity and the plurality of projections 342 which are situated between the permanent magnets 35, and to a rotary electrical machine having a consequent pole type of rotor.

Second Embodiment

Figure 14:
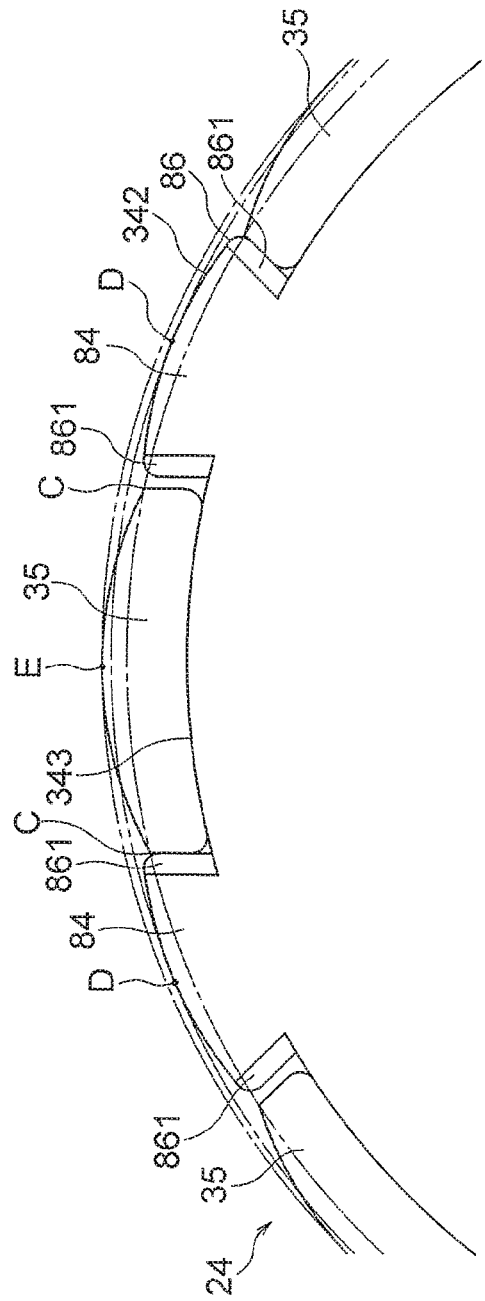
FIG. 14 is a principal cross-sectional diagram of a rotor according to a second embodiment of the present invention.

FIG. 14 is a principal cross-sectional diagram of the rotor 24 according to a second embodiment of this invention. When the rotor iron core 34 is viewed along the axis line P, if the point furthest from the axis line P of the radial-direction outer side end surface 84a of the first projecting section 84 is the outermost point D of the first projecting section 84, and if the circumferential-direction end section of the radial-direction outer side end surface of the permanent magnet 35 is point C, then the dimension between the outermost point D of the first projecting section 84 and the axis line P is greater than the dimension between point C and the axis line P. In other words, when the rotor iron core 34 is viewed along the axis line P, the maximum dimension between the radial-direction outer side end surface 84a of the first projecting section 84 and the axis line P is greater than the dimension between the circumferential-direction end section C of the radial-direction outer side end surface of the permanent magnet 35 and the axis line P.

Furthermore, when the rotor iron core 34 is viewed along the axis line P, if the point furthest from the axis line P of the radial-direction outer side end surface of the permanent magnet 35 is the outermost point E of the permanent magnet 35, then the dimension between the outermost point E of the permanent magnet 35 and the axis line P is greater than the dimension between the outermost point D of the first projecting section 84 and the axis line P. In other words, when the rotor iron core 34 is viewed along the axis line P, the maximum dimension between the radial-direction outer side end surface of the permanent magnet 35 and the axis line P is greater than the maximum dimension between the radial-direction outer side end surface 84a of the first projecting section 84 and the axis line P.

In other words, when the rotor iron core 34 is viewed along the axis line P, the outermost points D of the first projecting sections 84 are each positioned to the radial outer side of an arc passing through points C and centered on the axis line P, and are positioned to the radial outer side of an arc passing through the outermost points E of the permanent magnets 35 and centered on the axis line P.

In this example, the central point of the radial-direction outer side end surface 84a of the first projecting section 84 is taken to be the outermost point D and the central point of the radial-direction outer side end surface of the permanent magnet 35 is taken to be the outermost point E. Furthermore, in this example, the radial-direction outer side end surface 84a of each first projecting section 84 and the radial-direction outer side end surface 861a of each extension part 861 are both positioned to the radial outer side of an arc passing through the points C and centered on the axis line P. Moreover, in this example, when the rotor iron core 34 is viewed along the axis line P, the radius of curvature of the radial-direction outer side end surface 84a of the first projecting section 84 is greater than the radius of curvature of the radial-direction outer side end surface of the permanent magnet 35. The remaining configuration is similar to the first embodiment.

With the rotor 24 of this kind, when the rotor iron core 34 is viewed along the axis line P, the maximum dimension between the radial-direction outer side end surface 84a of the first projecting section 84 and the axis line P is greater than the dimension between the circumferential-direction end section C of the radial-direction outer side end surface of the permanent magnet 35 and the axis line P, and therefore it is possible to raise the height of the first projecting section 84 and to increase the volume of the projection 342. Consequently, the reluctance torque can be increased and the performance of the motor 8 can be improved.

Furthermore, when the rotor iron core 34 is viewed along the axis line P, the maximum dimension between the radial-direction outer side end surface of the permanent magnet 35 and the axis line P is greater than the maximum dimension between the radial-direction outer side end surface 84a of the first projecting section 84 and the axis line P, and therefore it is possible to prevent increase in the air gap between the permanent magnet 35 and the stator 22. Therefore, decline in the magnetic torque of the motor 8 can be further prevented and decline in the performance of the motor 8 can be further prevented.

Third Embodiment

Figure 15:
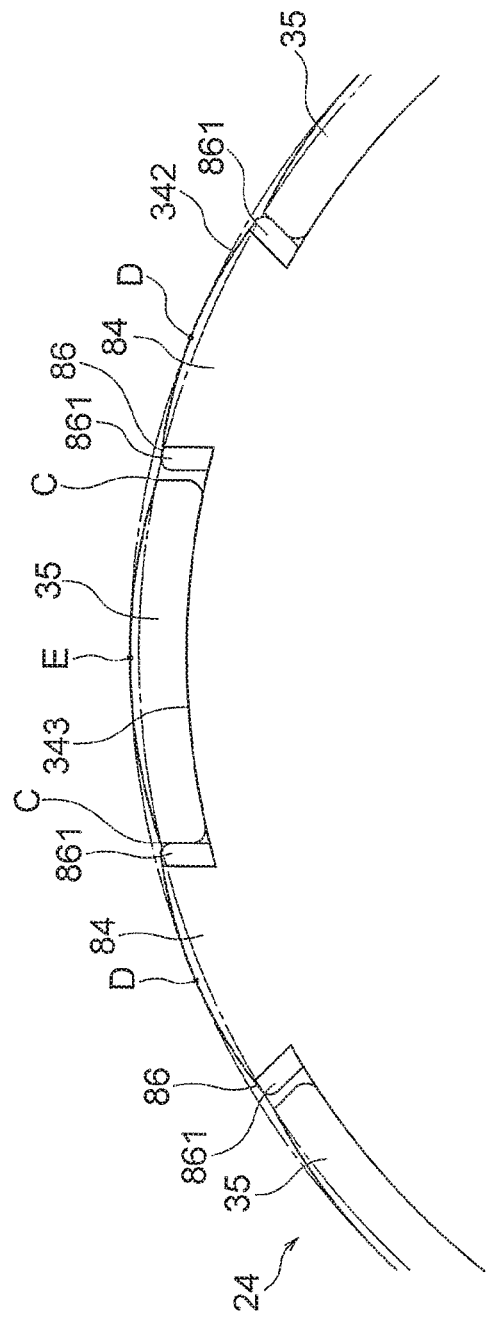
FIG. 15 is a principal cross-sectional diagram of a rotor according to a third embodiment of the present invention.

FIG. 15 is a principal cross-sectional diagram of the rotor 24 according to a third embodiment of this invention. When the rotor iron core 34 is viewed along the axis line P, the radius of curvature of the radial-direction outer side end surface of the permanent magnet 35 is greater than the radius of curvature of the radial-direction outer side end surface 84a and the first projecting section 84. In this example, the dimension between the outermost point D of the first projecting section 84 and the axis line P, and the dimension between the outermost point E of the permanent magnet 35 and the axis line P are the same. In other words, when the rotor iron core 34 is viewed along the axis line P, then a common arc centered on the axis line P passes respectively through the outermost point D of each first projecting section 84 and the outermost point E of each permanent magnet 35. Furthermore, in this example, the radial-direction outer side end surface 84a of the first projecting section 84 and the radial-direction outer side end surface 861a of the extension part 861 are both positioned to the radial outer side of the arc passing through point C, which is the circumferential-direction end section of the radial-direction outer side end surface of the permanent magnet 35, and centered on the axis line P. The remaining configuration is similar to the second embodiment.

Here, since the demagnetization resistance is increased when the coercive force of the permanent magnets 35 is high, then it is possible to reduce the thickness of the central portion of the permanent magnets 35 in the circumferential direction, and the radius of curvature of each of the radial-direction outer side end surfaces of the permanent magnets 35 can be increased. When a heavy rare earth element, such as dysprosium, for example, is added to the permanent magnets 35 in order to increase the coercive force of the permanent magnets 35, then the residual magnetic flux density Br of the permanent magnets 35 is reduced. Consequently, in order to increase the magnetic torque, it is possible to increase the dimension of the permanent magnets 35 in the axis line direction, or to increase the circumferential-direction dimension of the permanent magnets 35 by increasing the radius of curvature of each of the radial-direction outer side end surfaces of the permanent magnets 35.

However, when this configuration is adopted, the structure of the motor 8 is increased, and when the motor 8 is mounted in a vehicle, the fuel consumption of the vehicle becomes worse. On the other hand, when the radius of curvature of the radial-direction outer side end surface of each permanent magnet 35 is increased, thereby raising the circumferential-direction dimension of the permanent magnet 35, without enlarging the structure of the motor 8, then the circumferential-direction dimension of the first projecting section 84 becomes smaller, and if the radius of curvature of the radial-direction outer side end surface 84a of the first projecting section 84 is large, then the step difference between the permanent magnet 35 and the first projecting section 84 becomes larger.

In the present embodiment, the radius of curvature of the radial-direction outer side end surface 84a of the first projecting section 84 is smaller than the radius of curvature of the radial-direction outer side end surface of the permanent magnet 35. Consequently, increase in the step difference between the permanent magnet 35 and the first projecting section 84 is suppressed, while suppressing enlargement of the rotor 24.

In the rotor 24 of this kind, since the radius of curvature of the radial-direction outer side end surface 84a of the first projecting section 84 is smaller than the radius of curvature of the radial-direction outer side end surface of the permanent magnet 35, then even if the shape of the permanent magnet 35 is close to a flat shape, it is possible to suppress increase of the step difference between the permanent magnet 35 and the first projecting section 84, while restricting enlargement of the rotor 24. Consequently, problems due to enlargement of the motor 8 (for example, deterioration of the fuel consumption of the vehicle due to increase in the weight of the motor 8, or interference with other components due to increase in the installation space of the motor 8, etc.) can be avoided, and furthermore, improvement in the manufacturing efficiency of the rotor 24 can be achieved.

Fourth Embodiment

Figure 16:
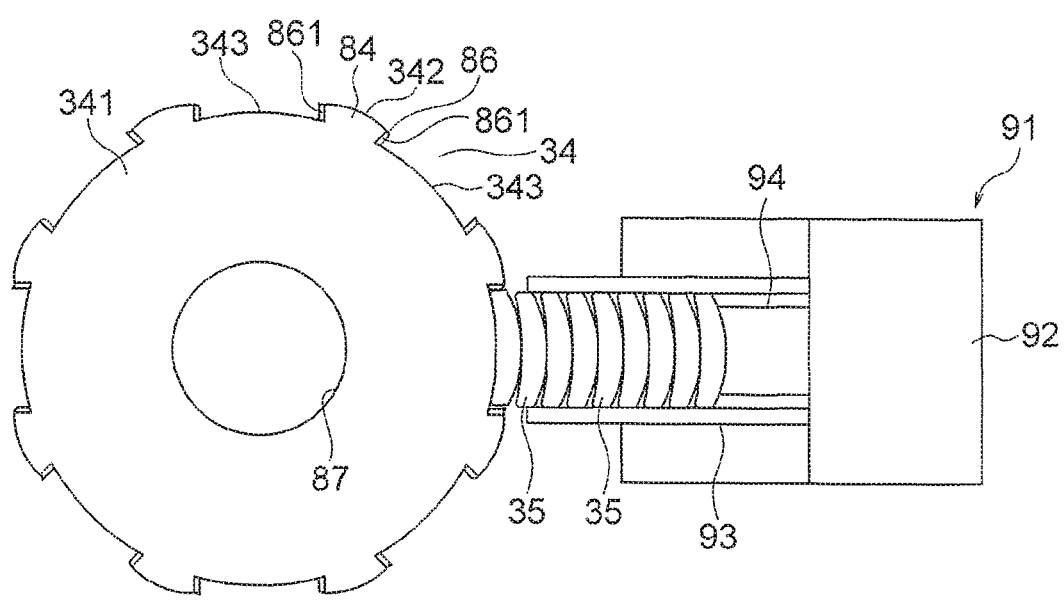
FIG. 16 is a schematic drawing of a case where a rotor according to a fourth embodiment of this invention is manufactured.

FIG. 16 is a schematic drawing of a case where the rotor 24 according to a fourth embodiment of this invention is manufactured. When the rotor iron core 34 is viewed along the axis line P, then the shapes of one and another extension part 861 which are situated between the first projecting sections 84 that are mutually adjacent in the circumferential direction of the rotor iron core 34 are asymmetrical shapes. In other word, the shapes of one and another extension part 861 which are situated on both sides, in the circumferential direction, of the recess section 343 which is formed between two projections 342 which are mutually adjacent in the circumferential direction of the rotor iron core 34 are asymmetrical shapes. In FIG. 16, the left-side extension part 861 of the recess section 343 is configured as the one extension part 861 and the right-side extension part 861 of the recess section 343 is configured as the other extension part 861.

More specifically, the radial-direction outer side end surface 861a of the one extension part 861 is a curved surface which curves smoothly from the radial-direction outer side end surface 84a of the first projecting section 84, to the inner radial side of the rotor iron core 34, towards the circumferential-direction end surface 861b of the one extension part 861. On the other hand, the radial-direction outer side end surface 861a of the other extension part 861 is a curved surface which curves smoothly from the radial-direction outer side end surface 84a of the first projecting section 84, to the radial outer side of the rotor iron core 34, towards the circumferential-direction end surface 861b of the other extension part 861. Consequently, the height of the circumferential-direction end surface 861b of the one extension part 861 is lower than the height of the circumferential-direction end surface 861b of the other extension part 861. In this example, the height of the circumferential-direction end surface 35a of the permanent magnet 35 is greater than the height of the circumferential-direction end surface 861b of both the one and the other extension parts 861.

Here, if the radius of curvature of the radial-direction outer side end surface 84a of the first projecting section 84 is small, then the height of the circumferential-direction end surface 861b of the extension part 861 becomes extremely low. In this case, there is a risk that the permanent magnet 35 will not be positioned reliably by the circumferential-direction end surface 861b of the extension part 861. In the present embodiment, the circumferential-direction end surface 35a of the permanent magnet 35 contacts the circumferential-direction end surface 861b of the other extension part 861 on the higher side, of the circumferential-direction end surfaces 861b of the one and the other extension parts 861. Consequently, the reliability of positioning of the permanent magnet 35 is increased, and the space 88 between the permanent magnet 35 and the first projecting section 84 is ensured. The remaining configuration is similar to the first embodiment.

When the permanent magnet 35 is installed in the recess section 343, the permanent magnet 35 is arranged inside the recess section 343 by a similar procedure to the first embodiment. Subsequently, the permanent magnet 35 is moved towards the other extension part 861 within the recess section 343, from a state where the circumferential-direction end surface 35a of the permanent magnet 35 is in contact with the circumferential-direction end surface 861b of the one extension part 861, and the circumferential-direction end surface 35a of the permanent magnet 35 is made to contact the circumferential-direction end surface 861b of the other extension part 861. The movement of the permanent magnets 35 within the recess sections 343 is performed by a device that is separate from the magnet installation device 91.

In the rotor 24 of this kind, since the shapes of the one and the other extension part 861 which are situated between the mutually adjacent first projecting sections 84 are asymmetrical shapes, then the height of the circumferential-direction end surface 861b of the other extension part 861, for example, can be made greater than the height of the circumferential-direction end surface 861b of the one extension part 861. Consequently, by the circumferential-direction end surface 861b of the one extension part 861 which has a lower height, it is possible to prevent the occurrence of damage to the permanent magnet 35 when the permanent magnet 35 slides and drops into the recess section 343, and by the circumferential-direction end surface 861b of the other extension part 861 which has a greater height, it is possible to position the permanent magnet 35 more reliably.

In the example described above, when the rotor iron core 34 is viewed along the axis line P, the one and the other extension part 861 which have mutually asymmetrical shapes protrude on both sides from each first projecting section 84 in the circumferential direction, but provided that the radial-direction outer side end surface 84a and the circumferential-direction end surface 84b of the first projecting section 84 are of a shape which avoids damage to the permanent magnet 35 when the permanent magnet 35 is installed in the rotor iron core 34, then it is possible for only the other extension part 861, which has a radial-direction outer side end surface 861a that curves smoothly towards the radial outer side of the rotor iron core 34, to project from the first projecting section 84. Even with this configuration, it is possible to prevent the occurrence of damage to the permanent magnets 35 during the manufacture of the rotor 24 by the first projecting section 84, and each permanent magnet 35 can be positioned with respect to the rotor iron core 34 by the other extension part 861.

Fifth Embodiment

Figure 17:
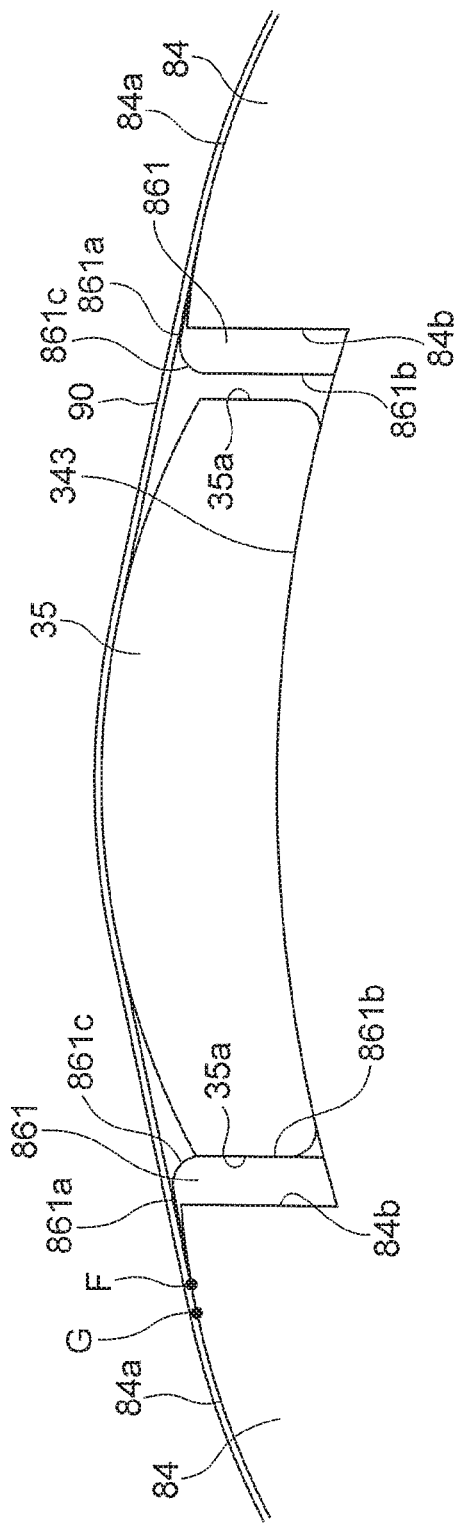
FIG. 17 is a principal cross-sectional diagram of a rotor according to a fifth embodiment of this invention.

FIG. 17 is a principal cross-sectional diagram of the rotor 24 according to a fifth embodiment of this invention. The stainless steel protective tube 90 surrounds the rotor iron core 34 and the permanent magnets 35 in state of contacting each of the radial-direction outer side end surfaces of the permanent magnets 35 and the radial-direction outer side end surfaces of the projections 342.

When the rotor iron core 34 is viewed along the axis line P, the radial-direction outer side end surfaces 861a of the extension parts 861 are positioned to the outside of the circumferential-direction end sections of the radial-direction outer side end surfaces 84a of the first projecting sections 84, in the radial direction of the rotor iron core 34. Furthermore, when the rotor iron core 34 is viewed along the axis line P, the radial-direction outer side end surfaces 861a of each extension part 861 are, at a first intermediate point F of the radial-direction outer side end surfaces 84a of the first projecting sections 84, smoothly continuous with the radial-direction outer side end surfaces 84a of the first projecting sections 84. Moreover, when the rotor iron core 34 is viewed along the axis line P, the inner surface of the protective tube 90 is smoothly continuous with the radial-direction outer side end surfaces 84a of the first projecting sections 84, at a second intermediate point G. Furthermore, when the rotor iron core 34 is viewed along the axis line P, the first intermediate point F is situated to the inside of the protective tube 90, in the radial direction of the rotor iron core 34, and is situated towards the side of the circumferential-direction end surface 84b of the first projecting section 84, from the second intermediate point G.

The radial-direction outer side end surface 84a of each first projecting section 84 contacts the inner surface of the protective tube 90. On the other hand, the radial-direction outer side end surface 861a of the extension part 861 is separated towards the inner radial side of the rotor iron core 34 from the inner surface of the protective tube 90. Consequently, the circumferential-direction end section of the radial-direction outer side end surface 84a of the first projecting section 84 is also separated towards the inner radial side of the rotor iron core 34 from the inner surface of the protective tube 90. The remaining configuration is similar to the first embodiment.

In the rotor 24 of this kind, when the rotor iron core 34 is viewed along the axis line P, the radial-direction outer side end surfaces 861a of the extension parts 861 are positioned to the outside of the circumferential-direction end sections of the radial-direction outer side end surfaces 84a of the first projecting sections 84, in the radial direction of the rotor iron core 34, and therefore it is possible to raise the height of the circumferential-direction end surfaces 861b of the extension parts 861. Consequently, it is possible to position the permanent magnets 35 within the recess sections 343 more reliably. Furthermore, since the volume of the second projecting sections 86 can be increased, then the reluctance torque produced by the second projecting sections 86 can also be increased. Consequently, it is possible to suppress decline in the performance of the motor 8, in a more reliable manner.

Furthermore, since the radial-direction outer side end surface 861a of each extension part 861 is separated towards the inner radial side of the rotor iron core 34 from the inner surface of the protective tube 90, then the circumferential-direction end section of the radial-direction outer side end surface 84a of each first projecting section 84 can be separated from the inner surface of the protective tube 90. Therefore, it is possible to avoid contact between the inner surface of the protective tube 90 and the circumferential-direction end sections of the first projecting sections 84, and it is possible to prevent occurrence of damage to the protective tube 90 due to contact of the first projecting sections 84 against the inner surface of the protective tube 90.

In the embodiments described above, the sum of the dimensions of the first iron cores 81 in the axis line direction is greater than the sum of the dimensions of the second iron cores 82, but it is also possible for the sum of the dimensions of the first iron cores 81 in the axis line direction to be the same as the sum of the dimensions of the second iron cores 82 in the axis line direction, or to be smaller than the sum of the dimensions of the second iron cores 82 in the axis line direction.

In the embodiments described above, when the rotor iron core 34 is viewed along the axis line P of the rotor iron core 34, the intermediate portion of the radial-direction outer side end surface of each second projecting section 86 overlaps with the radial-direction outer side end surface 84a of the first projecting section 84, but when the rotor iron core 34 is viewed along the axis line P of the rotor iron core 34, the position of the intermediate portion of the radial-direction outer side end surface of the second projecting section 86 may be situated towards to the inner radial side of the rotor iron core 34 with respect to the position of the radial-direction outer side end surface 84a of the first projecting section 84. In other words, the amount of projection of the circumferential-direction intermediate portion of the second projecting section 86 towards the radial outer side of the rotor iron core 34 may be made smaller than the amount of projection of the circumferential-direction intermediate portion of the first projecting section 84 towards the radial outer side of the rotor iron core 34. By adopting this configuration, it is possible to create a step difference between the radial-direction outer side end surfaces of the first and second projecting sections 84, 86 in a direction along the axis line P, and it is possible to readily identify, from the outside, the boundary between the first and second projecting sections 84, 86 in the direction along the axis line P, while suppressing decline in the reluctance torque of the motor 8. Consequently, it is possible to confirm, for instance, whether or not the first and second iron cores 81, 82, are present, and sorting between satisfactory and defective products can be carried out easily, for example.

Furthermore, in the embodiments described above, the motor 8 having the first and second armature coils 48, 49, which are three-phase coils, receives a supply of electricity from the first and second inverters 51, 52, but the number of the phases and inverters is not limited to this.

Furthermore, in the second to fifth embodiments, similarly to the first embodiment, the invention can also be applied to a consequent pole type of rotor in which mutually different polarities are formed by the plurality of permanent magnets 35 having the same polarity and the plurality of projections 342 which are situated between the permanent magnets 35, and to a rotary electrical machine having the consequent pole type of rotor.

Furthermore, the configuration of the fifth embodiment in which the position of the radial-direction outer side end surface 861a of each extension part 861 is situated to the outside of the position of the circumferential-direction end section of the radial-direction outer side end surface 84a of the first projecting section 84, in the radial direction of the rotor iron core 34, may be applied to the rotor iron core 34 of the second to fourth embodiments.

Furthermore, the configuration of the fourth embodiment in which, when the rotor iron core 34 is viewed along the axis line P, the shapes of the one and the other extension part 861 which are situated between the mutually adjacent first projecting sections 84 are configured as asymmetrical shapes, may be applied to the rotor iron core 34 of the second and third embodiments.

Furthermore, in the embodiments described above, this invention is applied to the motor 8 which is incorporated into an electrical power steering device for a vehicle, but the device into which the motor 8 is incorporated is not limited to this. Moreover, in the embodiments described above, the rotary electrical machine including the rotor 24 is used as the motor 8, but the invention is not limited to this, and the rotary electrical machine including the rotor 24 is used as a generator, or is used as a motor-generator.

The invention claimed is:

1. A rotor of a rotary electrical machine, comprising:
a rotor iron core having an axis line; and
a plurality of magnets provided in the rotor iron core, wherein
the rotor iron core includes first and second iron cores which are stacked mutually in a direction along the axis line;
the first iron core includes a first iron core main body and a plurality of first projecting sections which project to a radial outer side from an outer circumferential section of the first iron core main body and are arranged at intervals apart from each other in a circumferential direction of the first iron core main body;
the second iron core includes a second iron core main body, which overlaps with the first iron core main body, and a plurality of second projecting sections which project to a radial outer side from an outer circumferential section of the second iron core and are arranged at intervals apart from each other in a circumferential direction of the second iron core main body, in concordance with positions of the first projecting sections;
in the rotor iron core, a rotor iron core main body is configured from the first and second iron core main bodies, and projections are configured by the first and second projecting sections which are aligned in a direction along the axis line;
the magnets are provided in an outer circumferential section of the rotor iron core main body in a state of being arranged between the projections;
when the rotor iron core is viewed along the axis line, portions of the second projecting sections protrude as extension parts outward in the circumferential direction, from both sides of each of the first projecting sections in the circumferential direction;
when the rotor iron core is viewed along the axis line, radial-direction outer side end surfaces of the extension parts are smoothly continuous with radial-direction outer side end surfaces of the first projecting sections;
spaces are generated between the circumferential-direction end surfaces of the first projecting sections and the permanent magnets; and
a circumferential direction end surface of an extension part on a first side of each of the second projecting sections is spaced apart from a circumferential-direction end surface of an adjacent magnet, and a circumferential-direction end surface of an extension part on a second side of each of the second projecting sections is in contact with a circumferential-direction end surface of an adjacent magnet.

2. The rotor of a rotary electrical machine according to claim 1, wherein, when the rotor iron core is viewed along the axis line, a maximum dimension between the radial-direction outer side end surfaces of the first projecting sections and the axis line is smaller than a dimension between the circumferential-direction end sections of the radial-direction outer side end surfaces of the magnets and the axis line.

3. The rotor of a rotary electrical machine according to claim 1, wherein, when the rotor iron core is viewed along the axis line, a radius of curvature of each of the radial-direction outer side end surfaces of the first projecting sections is smaller than a radius of curvature of each of the radial-direction outer side end surfaces of the magnets.

4. The rotor of a rotary electrical machine according to claim 1, wherein, when the rotor iron core is viewed along the axis line, shapes of one and another of the extension parts, which are situated between first projecting sections that are mutually adjacent in the circumferential direction of the rotor iron core, are asymmetrical shapes.

5. A motor comprising the rotor according to claim 1, the motor being incorporated into an electric power steering device for a vehicle.

6. A motor comprising the rotor according to claim 1, wherein a dimension of the first projecting sections in a direction along the axis line is greater than a dimension of the second projecting sections in a direction along the axis line.

7. A rotor of a rotary electrical machine, comprising:
a rotor iron core having an axis line; and
a plurality of magnets provided in the rotor iron core, wherein
the rotor iron core includes first and second iron cores which are stacked mutually in a direction along the axis line;
the first iron core includes a first iron core main body and a plurality of first projecting sections which project to a radial outer side from an outer circumferential section of the first iron core main body and are arranged at intervals apart from each other in a circumferential direction of the first iron core main body;
the second iron core includes a second iron core main body, which overlaps with the first iron core main body, and a plurality of second projecting sections which project to a radial outer side from an outer circumferential section of the second iron core and are arranged at intervals apart from each other in a circumferential direction of the second iron core main body, in concordance with positions of the first projecting sections;
in the rotor iron core, a rotor iron core main body is configured from the first and second iron core main bodies, and projections are configured by the first and second projecting sections which are aligned in a direction along the axis line;
the magnets are provided in an outer circumferential section of the rotor iron core main body in a state of being arranged between the projections;
when the rotor iron core is viewed along the axis line, portions of the second projecting sections protrude as extension parts outward in the circumferential direction, from both sides of each of the first projecting sections in the circumferential direction;
when the rotor iron core is viewed along the axis line, radial-direction outer side end surfaces of the extension parts are smoothly continuous with radial-direction outer side end surfaces of the first projecting sections;
spaces are generated between the circumferential-direction end surfaces of the first projecting sections and the permanent magnets; and
when the rotor iron core is viewed along the axis line, the radial-direction outer side end surfaces of the extension parts are positioned further toward the outer side, in the radial direction of the rotor iron core, than a position of the circumferential-direction end sections of the radial-direction outer side end surfaces of the first projecting sections.

8. The rotor of a rotary electrical machine according to claim 7, further comprising a protective tube which surrounds the rotor iron core and the magnets, while contacting the respective radial-direction outer side end surfaces of the magnets and the respective radial-direction outer side end surfaces of the projections, wherein
- the radial-direction outer side end surfaces of the first projecting sections contact the inner surface of the protective tube; and
- the radial-direction outer side end surfaces of the extension parts are separated, toward an inner radial side of the rotor iron core, from the inner surface of the protective tube.

* * * * *